United States Patent
Cho et al.

(10) Patent No.: US 7,782,816 B2
(45) Date of Patent: Aug. 24, 2010

(54) APPARATUS AND METHOD FOR SUPPORTING HANDOVER IN A BROADBAND WIRELESS ACCESS COMMUNICATION SYSTEM

(75) Inventors: Jae-Weon Cho, Suwon-si (KR); Pan-Yuh Joo, Yongin-si (KR); Sie-Joon Cho, Seongnam-si (KR); Chi-Woo Lim, Suwon-si (KR); Young-Bin Chang, Seoul (KR); Seung-Joo Maeng, Seongnam-si (KR); Myung-Kwang Byun, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1367 days.

(21) Appl. No.: 11/156,169

(22) Filed: Jun. 17, 2005

(65) Prior Publication Data
US 2005/0288020 A1  Dec. 29, 2005

(30) Foreign Application Priority Data
Jun. 17, 2004 (KR) ...................... 10-2004-0045166

(51) Int. Cl.
*H04W 4/00* (2009.01)
(52) U.S. Cl. ................. 370/329; 370/341; 370/431; 370/331; 455/450; 455/446; 455/436
(58) Field of Classification Search ............. 455/450, 455/446, 436; 370/329, 341, 431, 331
See application file for complete search history.

(56) References Cited

U.S. PATENT DOCUMENTS

| | | | |
|---|---|---|---|
| 5,613,200 A | * | 3/1997 | Hamabe ................. 455/450 |
| 6,038,450 A | * | 3/2000 | Brink et al. ............. 455/442 |
| 6,175,736 B1 | | 1/2001 | Lee et al. |
| 2005/0047259 A1 | * | 3/2005 | Ahn et al. ................ 365/232 |

FOREIGN PATENT DOCUMENTS

| | | |
|---|---|---|
| EP | 0 917 308 | 5/1999 |
| KR | 100248405 | 12/1999 |
| WO | WO 03/081938 | 10/2003 |

* cited by examiner

*Primary Examiner*—Patrick N Edouard
*Assistant Examiner*—Aung Win
(74) *Attorney, Agent, or Firm*—The Farrell Law Firm, LLP

(57) ABSTRACT

Disclosed is a method for supporting a handover in a broadband wireless access communication system which includes a mobile subscriber station, a serving base station currently providing service to the mobile subscriber station, and a plurality of adjacent base stations different from the serving base station, in which each of the base stations includes cells using subchannel bands different from each other, the method including establishing a set of base stations which currently provide wireless channels for data transmission/reception to the mobile subscriber station; classifying, by each base station, entire subchannels into a plurality of sets of subchannels; and allocating each of the sets of subchannels obtained by the classification to a PUSC (Partial Usage of Subchannels) subchannel area of each sector, wherein, every base stations included in an active set select an equal number of PUSC subchannels from among a PUSC subchannel area allocated to each of the base stations and allocate the selected PUSC subchannels to the mobile subscriber station, and the mobile subscriber station receives a downlink signal transmitted through each of PUSC subchannel areas and performs a predetermined combining of all signals received from each of the BSs.

12 Claims, 13 Drawing Sheets

APPARATUS AND METHOD FOR SUPPORTING HANDOVER IN A BROADBAND WIRELESS ACCESS COMMUNICATION SYSTEM

PRIORITY

This application claims the benefit under 35 U.S.C. 119(a) of an application entitled "Apparatus And Method For Supporting Handover In Broadband Wireless Access Communication System" filed in the Korean Intellectual Property Office on Jun. 17, 2004 and assigned Serial No. 2004-45166, the entire contents of which are incorporated herein by reference.

BACKGROUND OF THE INVENTION

1. Field of the Invention

The present invention relates to handover in a broadband wireless access communication system, and more particularly to an apparatus and method for a soft handover in a communication system employing an orthogonal frequency division multiple access scheme.

2. Description of the Related Art

Fourth generation (4G) communication systems (the next generation communication system) are being designed to provide users with services having various Qualities of Service (QoS) supporting a transmission speed of about 100 Mbps. Current third generation (3G) communication systems support a transmission speed of about 384 kbps in a relatively unfavorable outdoor channel environment, and support a maximum transmission speed of 2 Mbps in a relatively favorable indoor channel environment.

Wireless Local Area Network (LAN) system and wireless Metropolitan Area Network (MAN) system generally support transmission speeds of 20 to 50 30 Mbps. In current 4G communication systems, research is being conducted to develop a new type of communication system for ensuring the mobility and QoS in the wireless LAN and MAN systems supporting relatively high transmission speeds in order to support a high speed service to be provided by the 4G communication system.

Since the wireless MAN system has a wide service coverage area and supports a high transmission speed, it is suitable for supporting high speed communication services. However, the wireless MAN system reflects a single cell structure, without providing for the mobility of the user, i.e., a Subscriber Station (SS); the wireless MAN system does not provide for a handover to accommodate high speed movement of the SS.

Research is being conducted to develop an apparatus and scenario for supporting a handover according to high speed movement of the SS. A representative system for reflecting movement of the SS is the IEEE (Institute of Electrical and Electronics Engineers) 802.16a communication system. In this document, an SS having mobility is referred to as a 'Mobile Subscriber Station (MSS)'.

FIG. 1 is a block diagram schematically illustrating the cell structure of a general IEEE 802.16e communication system.

The IEEE 802.16e communication system has a multi-cell structure, that is, has a cell 100 and a cell 150. In addition, the IEEE 802.16e communication system includes a Base Station (BS) 110 controlling the cell 100, a BS 140 controlling the cell 150, and a plurality of MSSs 111, 113, 130, 151 and 153. The transmission/reception of signals between the BSs 110 and 140 and the MSSs 111, 113, 130, 151 and 153 is executed according to the Orthogonal Frequency Division Multiplexing (OFDM) and the Orthogonal Frequency Division Multiple Access (OFDMA) schemes.

From among the MSSs 111, 113, 130, 151 and 153, the MSS 130 is located in a cell boundary area, i.e., handover area, between the cell 100 and the cell 150. Accordingly, only when handover for the MSS 130 is supported, is it possible to support the mobility of the MSS 130.

The wireless MAN system is a broadband wireless access (BWA) communication system, which has a wider service coverage and supports a higher transmission speed than the wireless LAN system. The IEEE 802.16e communication system employs the OFDM scheme and the OFDMA scheme to enable a physical channel of the wireless MAN system to support a broadband transmission network.

As described above, the IEEE 802.16e system supports handover for an MSS, but supports only a hard handover scheme. According to the hard handover scheme, when a hard handover is performed, the MSS terminates all connections to a serving BS currently providing service before establishing a new connection to another BS, i.e., to a target BS, from which the MSS desires to receive new service.

In the IEEE 802.16e communication system, when the intensity, i.e., the carrier-to-interference-and-noise ratio (CINR), of a signal received from a current serving BS decreases to such a degree that it is impossible to maintain communication with the current serving BS, the MSS performs a handover to a neighbor BS (i.e., target BS) in response to a request from the MSS or the current serving BS.

However, while the MSS is performing a handover operation to the target base station in the IEEE 802.16e communication system, if the CINR of a signal received from the target base station decreases to such a degree that it is impossible to receive a desired service from the target base station, the MSS can change its connection to the serving base station. For example, signal shadowing occurs due to obstructions on the wireless channel. When an MSS passes through a cell boundary area, this is, when the MSS is located in a handover area, a phenomenon occurs where the CINR of a signal received from the target base station becomes higher and then lower than that of a signal received from the serving base station occurs. If it is determined that a handover is initialized when the intensity of a signal received from the target base station becomes equal to that of a signal received from the serving base station, a handover operation may occur repeatedly while the MSS is passing through the cell boundary area. Such a phenomenon is called a 'ping-pong effect'. When the ping-pong effect occurs, handover signaling greatly increases, so that the probability of handover failure also increases.

FIG. 2 is a schematic graph for explaining a ping-pong effect occurring in the IEEE 802.16e communication system.

FIG. 2 shows a ping-pong effect occurring according to the performance of the conventional hard handover when an MSS moves from a first base station (BS 1) to a second base station (BS 2). To be specific, FIG. 2 shows a graph for illustrating the intensities of signals received from the first and second BSs to the MSS when the MSS is located in a handover area which is a service coverage overlapped by the first and second BSs. In the following description, it is assumed that the first BS is a serving BS and the second BS is a target BS.

Referring to FIG. 2, when the MSS moves from the serving BS (BS 1) to the target BS (BS 2), a handover is executed at three time points in total, i.e., at time points 'A1', 'A2' and 'A3'. This is because it is assumed that the normal IEEE 802.16e communication system performs a hard handover, and that the hard handover is performed at a time point at which the CINR of a signal received from the target BS becomes equal to that of a signal received from the serving BS.

As described above, the occurrence of the ping-pong effect increases the signaling load of the system, which increases the probability of handover failure and also deteriorates performance of the entire system.

To avoid the ping-pong effect which is problematic of the hard handover, a handover parameter called 'Hysteresis margin' may be used. In other words, while the MSS moves from the serving BS to the target BS, a handover is performed only when the intensity of a signal received from the target BS is greater than that of the signal received from the serving BS by the Hysteresis margin. When the Hysteresis margin is used, unnecessary handover operations caused by the ping-pong effect are prevented.

However, when the Hysteresis margin is used, a handover is performed not in the handover area, but at a location near the target BS, i.e., at a location near the target BS from a cell boundary. Therefore, as compared with the case where the hysteresis margin is not used, the intensity of a signal received from the serving BS at the cell boundary may be very poor.

In FIG. 2, when a Hysteresis margin is set as 'H' and the Hysteresis margin 'H' is used, the MSS performs a handover only once at time point 'B'. However, it can be confirmed that the intensity of a signal received from the serving BS when the Hysteresis margin is used, is smaller than that when the Hysteresis margin is not used. Thus, when the Hysteresis margin is used, the intensity of a signal received from the serving BS is poor, so that the connection between the MSS and the serving BS may be cut off before the MSS completes handover to the target BS.

To solve the problem of the hard handover as described above, a soft handover scheme has been proposed. The soft handover scheme is a communication technique, wherein the MSS establishes a connection to the target BS before ending a connection to the serving BS so that the MSS performs communication with two BSs (i.e. the serving BS and target BS) at the same time in a predetermined cell boundary area, i.e. in a handover area.

When the soft handover is performed in a downlink, the serving BS and the target BS transmit the same data to one MSS through wireless channels occupying the same frequency band at the same point in time. In addition, when the soft handover is performed in an uplink, both the serving BS and target BS receive a signal transmitted from the MSS. Therefore, when the soft handover scheme is employed, it is possible to prevent both the ping-pong effect which is a problematic of the hard handover and the phenomenon of decreasing signal intensity. In addition, when the soft handover is employed, the MSS is allocated with wireless channels simultaneously from the two BSs in a downlink, so that the CINR of a received signal is improved. In addition, since the two BSs simultaneously receive a signal transmitted from one MSS in an uplink, it is possible to improve the quality of the uplink by applying a macro diversity scheme to two signals received in the serving BS and the target BS.

However, although the soft handover has the above-mentioned advantage, a difficulty lies in applying the soft handover as it is without changing the current standardized sub-channel allocation scheme in the normal IEEE 802.16e communication system. That is, to provide the soft handover, two neighbor BSs, i.e. a serving BS and a target BS, must allocate the same subchannel including the same sub-carriers at the same time. Herein, the subchannel represents a channel including at least one sub-carrier, and sub-carriers included in the subchannel may or may not be neighbor to each other in the frequency domain.

FIG. 3 is a diagram for schematically illustrating the frame structure of a normal IEEE 802.16e communication system.

First, the frame includes a Downlink frame ("DL frame") and an Uplink frame ("UL frame"). The downlink frame includes a preamble area, a broadcasting control area and a data transmission area. The broadcasting control area includes a downlink MAP ("DL-MAP") area and an uplink MAP ("UL-MAP") area. The data transmission area may be classified into a partial-usage-of-subchannels ("PUSC") area and a full-usage-of-subchannels ("FUSC"). The "PUSC" subchannel and the "FUSC" subchannel may be distinguished by time division in the same frame. In addition, the uplink frame includes an FUSC area and a PUSC area. FIG. 3 illustrates a frame structure for sub-carrier allocation of a sector using a downlink PUSC, a downlink FUSC and an uplink PUSC.

A synchronization signal (e.g., a preamble sequence) for acquiring synchronization between a transmitter and a receiver, i.e., between a BS and an MSS is transmitted through the preamble area. A DL-MAP message and a UL-MAP message are transmitted through the DL-MAP area and the UL-MAP area, respectively. Herein, information elements (IEs) included in the DL-MAP message and the UL-MAP message have no direct relation with the present invention, so description thereof will be omitted.

The PUSC area represents data burst including subchannels based on a PUSC scheme, and the FUSC area represents data burst areas including subchannels based on a FUSC scheme.

According to the PUSC scheme, each sector allocates and uses only partial subchannels of the whole subchannels. When the PUSC scheme is employed, the frequency reuse factor becomes larger than "1". Therefore, PUSC areas different from each other are allocated to the sectors of two neighbor cells so as to avoid mutual interference between sectors. However, it is problematic when two BSs allocate an MSS located at a cell boundary with a PUSC area having the same sub-carrier.

According to the FUSC scheme, all sectors of all cells allocate and use the whole subchannels. When the FUSC scheme is employed, the frequency reuse factor becomes "1". However, when the FUSC scheme is employed, although all sectors can use all of the subchannels, a distinct set of sub-carriers configuring a subchannel must be configured according to each sector. That is, it is necessary to design the FUSC so as to minimize a probability that corresponding sub-carriers between subchannels are overlapped, i.e. a hit probability. It is necessary to allocate the same subchannel having the same sub-carriers to two sectors to provide the soft handover, but it is impossible, using the current FUSC scheme, to provide such subchannel allocation. In other words, the current communication system has been proposed for the subchannel configuration schemes supporting the FUSC and PUSC schemes, but does not provide a distinct subchannel configuration scheme for supporting the handover scheme.

In spite of the merit of soft handover as described above, it is nearly impossible, under the existing subchannel structure, to provide soft handover that simultaneously uses the same channels. Therefore, it is necessary to develop a scheme capable of providing soft handover in a broadband wireless access communication system. Accordingly, a new data transmission method and system for the conventional soft handover is required.

SUMMARY OF THE INVENTION

Accordingly, the present invention has been made to solve the above-mentioned problems occurring in the prior art, and an object of the present invention is to provide a method for allocating a subchannel for a soft handover in an Orthogonal Frequency Division Multiple Access (OFDMA) communication system.

Another object of the present invention is to provide a method for allocating uplink and downlink subchannels for performing a soft handover in an OFDMA communication system, and transmission and reception apparatuses for supporting the allocation.

To accomplish these objects, in accordance with one aspect of the present invention, there is provided a method for supporting a handover in a broadband wireless access communication system that includes a Mobile Subscriber Station (MSS), a serving BS currently providing service to the MSS, and a plurality of neighbor BSs, in which each of the BSs includes cells using distinct subchannel bands, the method including establishing a set of BSs that currently provide wireless channels for data transmission/reception MSS; classifying, by each BS, entire subchannels into a plurality of sets of subchannels; and allocating each of the sets of subchannels obtained by the classification to a PUSC (Partial Usage of Subchannels) subchannel area of each sector, wherein, every BS included in an active set selects an equal number of PUSC subchannels from among a PUSC subchannel area allocated to each of the BSs and allocate the selected PUSC subchannels to the mobile subscriber station, and the MSS receives a downlink signal transmitted through each of the PUSC subchannel areas and performs a predetermined combining of all signals from each of the BSs.

In accordance with another aspect of the present invention, there is provided a method for supporting a handover in a broadband wireless access communication system that includes a mobile subscriber station, a serving BS currently providing service to the mobile subscriber station, and a plurality of neighbor BSs, in which each of the BSs includes cells using subchannel bands, the method including establishing a set of BSs that currently provide wireless channels for data transmission/reception to the MSS; classifying, by each BS, entire subchannels into a plurality of sets of subchannels; and allocating each of the sets of subchannels obtained by the classification to a PUSC (Partial Usage of Subchannels) subchannel area of each sector, wherein, a latest-registered BS from among BSs included in an active set selects a PUSC subchannel, from among its own PUSC subchannel area, and transmits the selected PUSC subchannel to the mobile subscriber station, and the mobile subscriber station transmits an uplink signal through only the PUSC subchannel.

In accordance with still another aspect of the present invention, there is provided a method for supporting a handover in a communication system employing an orthogonal frequency division multiple access scheme, the method including allocating, by each sector included in an active set, a plurality of PUSC subchannels and transmitting same data to a relevant mobile subscriber station through a downlink; and performing a soft combining of signals of the plurality of PUSC subchannels and performing a handover according to the performed soft combining.

In accordance with still another aspect of the present invention, there is provided a method for supporting a handover in a communication system employing an orthogonal frequency division multiple access scheme, the method including allocating a PUSC subchannel, which is included in a PUSC area of one sector in an active set, to a mobile subscriber station through an uplink; transmitting, by the mobile subscriber station, data through the allocated PUSC subchannel; receiving, by at least one BS, an uplink transmission signal transmitted from the mobile subscriber station; and performing a soft handover to a corresponding BS which has received the transmission signal.

In accordance with still another aspect of the present invention, there is provided a BS apparatus for a handover in a communication system employing an orthogonal frequency division multiple access scheme, the BS apparatus including a transmission section for performing a channel coding and modulation processing of a generated user information signal, and outputting the processed signal through a transmission module for a corresponding sector connected to a mobile subscriber station corresponding to the user information from among transmission modules for sectors; and a reception section for performing a discrete Fourier Transform (DFT) processing of received signals corresponding to each sector, compensating each of the received signals, and performing a soft combining of the compensated received signals by using a predetermined weight.

In accordance with still another aspect of the present invention, there is provided a mobile subscriber station apparatus for a handover in a communication system employing an orthogonal frequency division multiple access scheme, the mobile subscriber station apparatus including a transmission section for performing a channel coding and modulation processing of a generated user information signal, and then outputting the processed signal through a plurality of antennas in a time division scheme; and a reception section for converting a received signal received through the plurality of antennas into a baseband signal, performing a DFT processing for the converted signal, and performing a channel estimation and compensation of the DFT-processed signal according to each sector.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
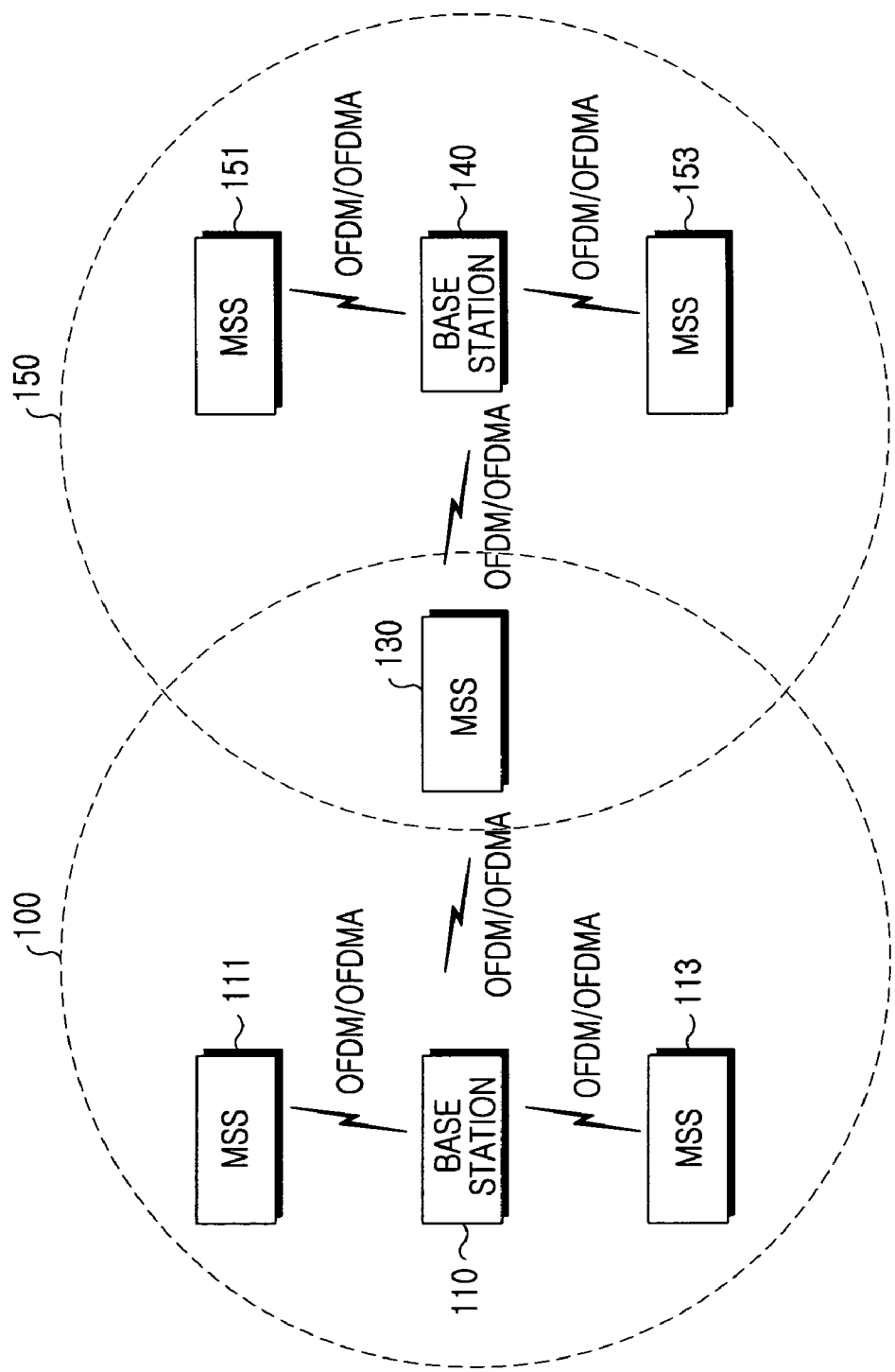
FIG. 1 is a block diagram schematically illustrating a cell structure of a typical broadband wireless access communication system employing an orthogonal frequency division multiple access (OFDMA) scheme.
Figure 2:
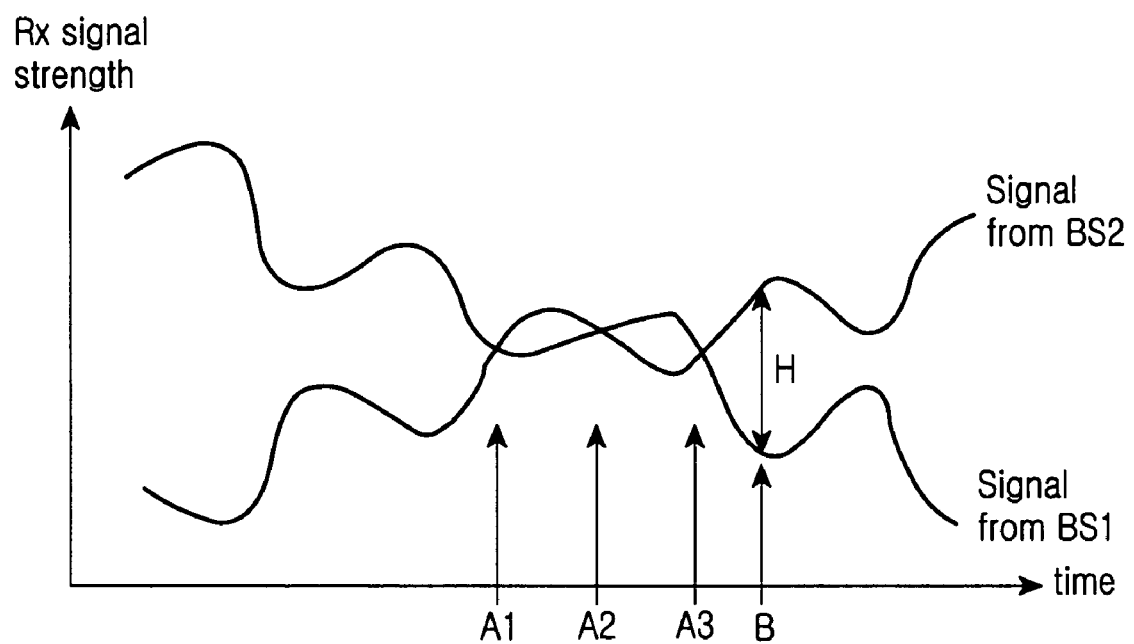
FIG. 2 is a schematic graph for explaining a ping-pong effect occurring in a typical broadband wireless access communication system.
Figure 3:
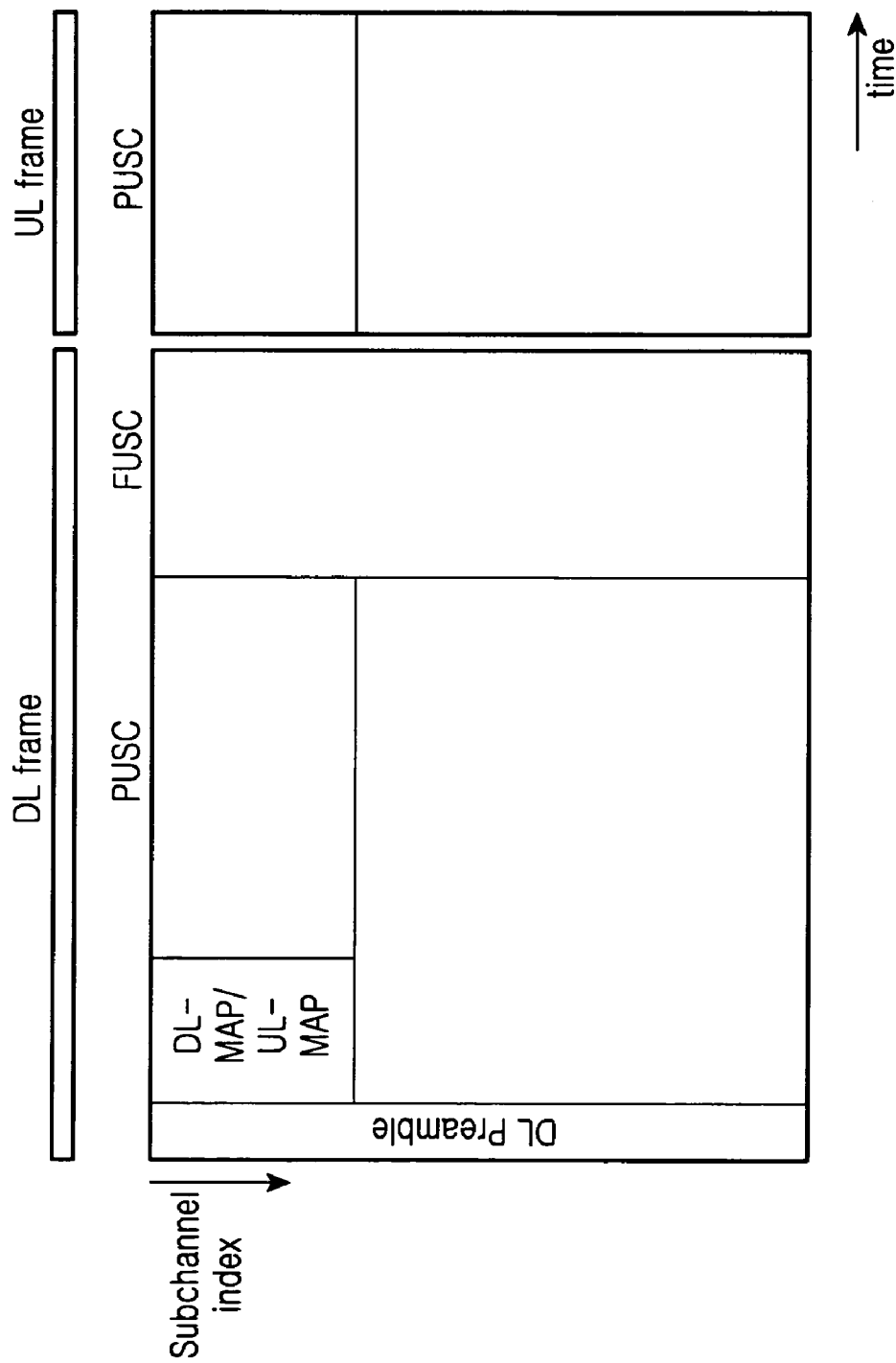
FIG. 3 is a diagram for schematically illustrating a frame structure of a typical broadband wireless access communication system employing the OFDMA.

Hereinafter, preferred embodiments according to the present invention will be described with reference to the accompanying drawings. In the following description of the embodiments of the present invention, a detailed description of known functions and configurations incorporated herein will be omitted when it may obscure the subject matter of the present invention.

The present invention provides an apparatus and method for providing a soft handover in an Orthogonal Frequency Division Multiple Access (OFDMA) communication system. The present invention proposes a data burst transmission/reception method and system for supporting the soft handover.

In addition, the present invention employs PUSC subchannels to provide a soft handover. That is, each cell classifies the whole subchannels into a plurality of subchannel sets and allocates each of the subchannel sets to the PUSC area of each sector.

It should be noted that the present invention may be applied to downlink and uplink cases.

First, in the case of a downlink, all sectors included in an active set select the same number of PUSC subchannels to allocate a Mobile Subscriber Station (MSS). In the description of the present invention, the active set is defined as a set of sectors that currently provide wireless channels for data communication with an MSS. The MSS receives all the downlink signals transmitted through each PUSC subchannel area. In this case, all of the signals transmitted through the PUSC subchannel area include the same information, to which the same modulation scheme and the same coding scheme are applied. Therefore, the MSS performs soft combining of all transmission signals of each sector that have been received according to each PUSC subchannel.

Herein, the 'soft combining' includes 'coherent combining'. It should be noted in the following description that the 'soft combining' and the 'coherent combining' are expressed only as 'soft combining' for convenience of description, but the scope of the invention is not limited to such terms. 'Soft combining' performs combining of a plurality of signals by using channel state information as weights after individually compensating the signals.

When such a scheme according to the present invention is employed, the MSS can perform soft combining of downlink signals although sectors use PUSC subchannels of different frequency bands or different OFDM symbols, so that a high diversity gain can be obtained.

In the case of an uplink, a master sector (or a master BS) of sectors included in an active set selects a PUSC subchannel allocated to itself from among a PUSC subchannel area and allocates the selected PUSC subchannel to an MSS. The latest-registered sector (or latest-registered BS)in the active set may be determined as the master sector (or master BS). The MSS transmits an uplink signal through a PUSC subchannel allocated in the PUSC subchannel area of the master sector. In this case, signals transmitted from the PUSC subchannel area have the same information, to which the same modulation scheme and the same coding scheme are applied. The other sectors, except for the master sector, included in the active set may understand the PUSC subchannel that is used for transmission of an uplink signal by the MSS, through signaling with the master sector. Therefore, the other sectors included in the active set can receive an uplink signal received through the PUSC subchannel area of the master sector.

Such a scheme according to the present invention enables all sectors included in the active set to receive and demodulate a transmission signal transmitted from the MSS.

When the active set includes sectors belonging to different Base stations (BSs), a BS of the master sector or a Base Station Controller (BSC), which is an upper stage for managing the BS, may select the best signal received to a plurality of sectors. In this case, the signal having the best reception quality may be selected from among a plurality of uplink reception signals, thereby obtaining a selection gain in an uplink.

When all sectors included in the active set belongs to the same BS, that is, when a softer handover is performed, the BS can perform a soft combining of signals received from the sectors. In this case, it is possible to obtain a combining gain in an uplink. Herein, the 'softer handover' represents a soft handover between sectors belonging to the same BS.

FIGS. 4A to 4D are diagrams schematically illustrating a PUSC allocation scheme for the soft handover in a communication system according to an embodiment of the present invention.

Figure 4A:
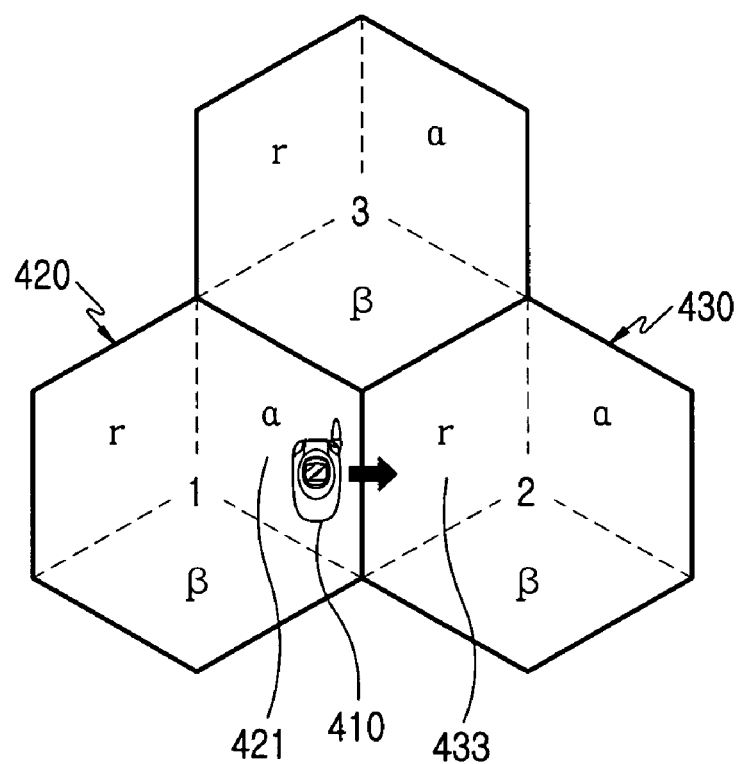
FIGS. 4A to 4D are diagrams schematically illustrating a PUSC-type subchannel allocation scheme for a soft handover in a broadband wireless access communication system according to an embodiment of the present invention.
Figure 4B:
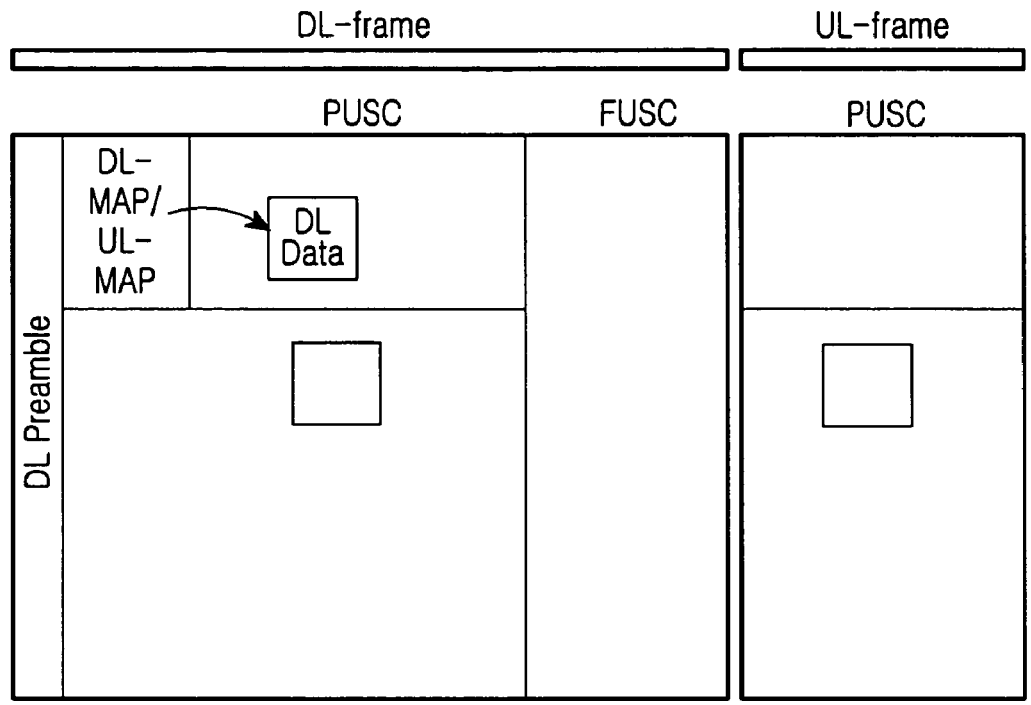
Figure 4B:
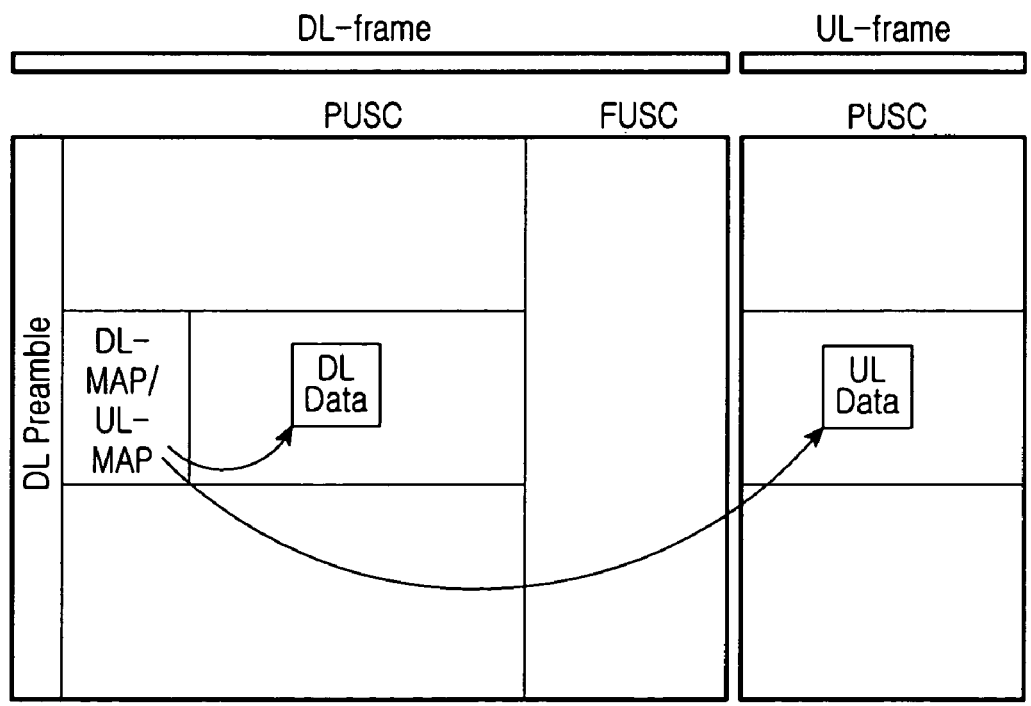

FIGS. 4A and 4B show a case in which an MSS 410 moves from an α sector 421 of cell #1 420, which is a service coverage of a BS 1 (i.e., serving BS), to a γ sector 433 of cell #2 430, which is a service coverage of a BS 2 (i.e. target BS). In this case, the MSS 410 in the α sector 421 of cell #1 420 uses only one PUSC subchannel of the PUSC area allocated to the α sector 421. Thereafter, the MSS 410 moves to a boundary area of the γ sector 433 of cell #2 430 and initiates a soft handover.

When the soft handover is initiated, one PUSC subchannel from among the PUSC area of the γ sector 433 of cell #2 430 is additionally allocated to the MSS 410 in the downlink. During the soft handover, the MSS 410 is allocated with different downlink PUSC subchannels from the α sector of cell #1 and the γ sector of cell #2. That is, the MSS 410 receives signals via two distinct PUSC subchannels, and performs soft combining of the two received signals.

Meanwhile, when the soft handover is initiated, an allocated PUSC subchannel area changes from the α sector 421 of cell #1 420 to the γ sector 433 of cell #2 430 in the uplink. That is, in the case of FIG. 4B, the γ sector 433 of cell #2 430 is additionally included in the active set, thereby being a master sector. Herein, the latest-registered sector in the active sector is may be determined as the 'master sector'.

Therefore, during the soft handover, data are transmitted through the PUSC subchannel area of the γ sector 433 of cell #2 430, which is the master sector. In this case, the α sector 421 of cell #1 420 can understand the PUSC subchannel, which the MSS 410 will use, through network signaling with the γ sector 433 of cell #2 430 before performing transmission to the MSS 410. Therefore, the α sector 421 of cell #1 420, too, can receive and demodulate a transmission signal of the MSS 410.

Thereafter, two signals received and demodulated by the α sector 421 of cell #1 420 and the γ sector 433 of cell #2 430, respectively, are transmitted to the BSC. Then, the BSC selects the signal with the better reception state. In this case, a selection criterion may be a cyclic redundancy check (CRC) bit included in each message.

Figure 4C:
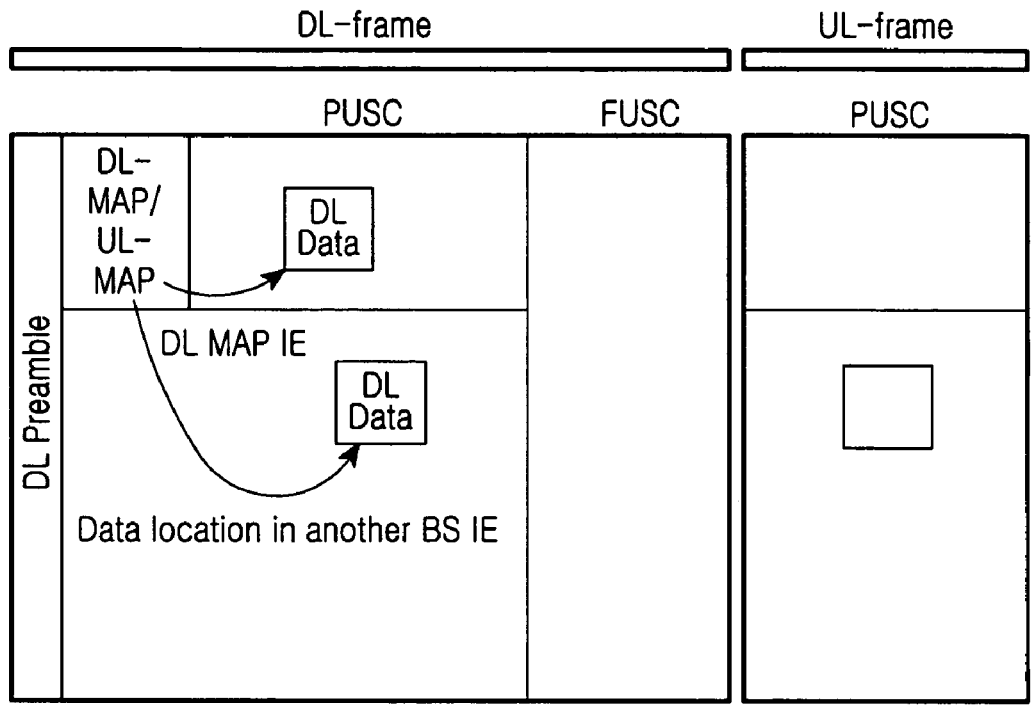
Figure 4C:
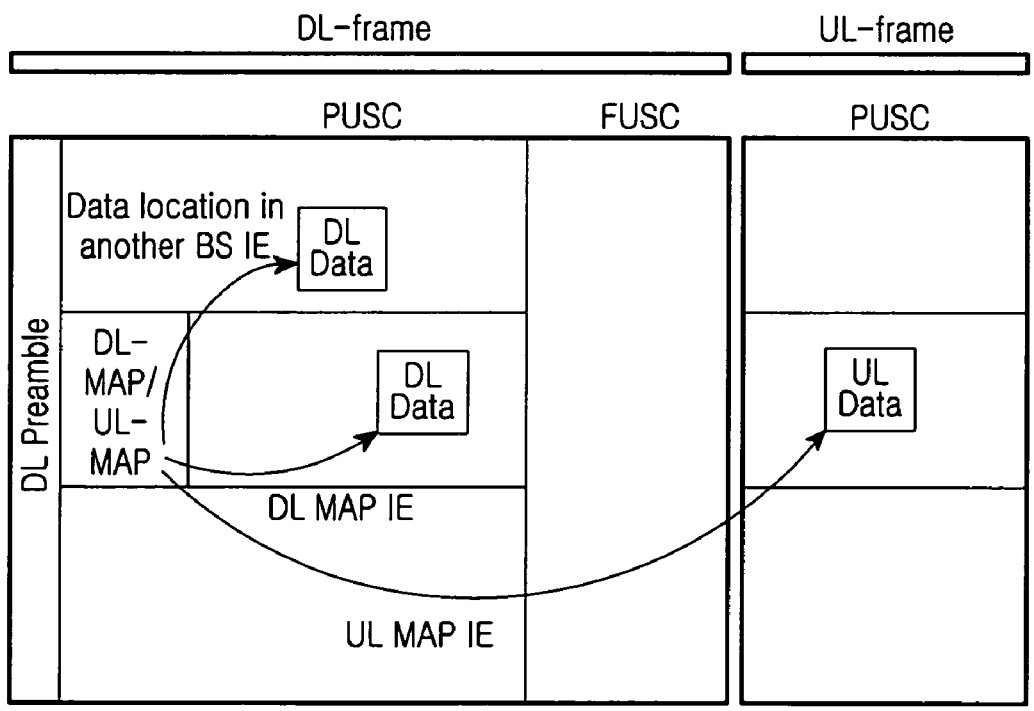

FIG. 4C shows a diagram for explaining a PUSC subchannel allocation scheme according to an alternative embodiment of the present invention. That is, FIG. 4C shows the case in which the same soft handover operation as that shown in FIG. 4B is performed but MAP information elements for appointing a downlink data burst position are different from those of FIG. 4B.

To be specific, in the case shown in FIG. 4B, information elements (IEs) included in a downlink MAP (DL_MAP) message in the IEEE 802.16e system are used as MAP IEs for appointing a downlink data burst position. In this case, the DL_MAP IEs can appoint a position for a data burst in a corresponding PUSC subchannel area.

The IEs included in the DL_MAP message will now be described schematically with reference to Table 1.

TABLE 1

| Syntax | Size | Notes |
|---|---|---|
| DL-MAP_Message_Format ( ) { | | |
| Management Message Type=2 | 8 bits | |
| PHY Synchronization Field | Variable | See appropriate PHY specification |
| DCD Count | 8 bits | |
| Base Station ID | 18 bits | |
| Begin PHY Specific Section { | | See applicable PHY section |
| for (i=1; i<=n; i++) { | | For each DL-MAP element 1 to n |
| DL-MAP_IE ( ) | Variable | See corresponding PHY specification |
| } | | |
| } | | |
| If ! (byte boundary) { | | |
| Padding Nibble | 4 bits | Padding to reach byte boundary |
| } | | |
| } | | |

As shown in Table 1, the DL_MAP message includes a plurality of IEs, that is, the 'Management Message Type' indicating the type of a transmitted message, the 'PHY (PHYsical) Synchronization' field set according to a modulation scheme and a demodulation scheme applied to a physical channel to obtain synchronization, the 'DCD count' indicating the configuration variation of a downlink channel descript (DCD) message containing a downlink burst profile, and the 'Base Station ID' indicating a base station identifier. In addition, the DL_MAP message may include an IE of 'Number of DL_MAP Elements n' indicating the number of elements existing after the Base Station ID. In addition, although it is not shown in Table, the. DL_MAP message contains information about ranging codes allocated to each ranging.

In the case of FIG. 4C, not only the DL_MAP IEs, but also 'Data location in another BS IEs' of the IEEE 802.16 system are used as MAP IEs for appointing a data burst position. In this case, the DL_MAP IEs are used to appoint a position for a data burst in the corresponding PUSC subchannel area, and the 'Data location in another BS IEs' is used to appoint a position for a data burst in another PUSC subchannel area.

Herein, the MAP_IE use method of FIG. 4B and the MAP_IE use method of FIG. 4C have their own unique advantages and disadvantages. That is, according to the MAP_IE use method of FIG. 4B, two positions of a downlink burst allocated to the MSS 410 are reported to both of two sectors, i.e. the sectors 420 and 430, thereby improving the reliability of IE transmission. However, each of the sectors 420 and 430 use the downlink MAP IEs two times, increasing consumption of MAP resources.

In the case of an uplink, UL_MAP IEs of the IEEE 802.16 system are used in both of FIGS. 4B and 4C. The IEs included in the UL_MAP message will now be described schematically with reference to Table 2.

TABLE 2

| Syntax | Size | Notes |
|---|---|---|
| UL-MAP_Message_Format ( ) { | | |
| Management Message Type=3 | 8 bits | |
| Uplink Channel ID | 8 bits | |
| UCD Count | 8 bits | |
| Allocation Start Time | 32 bits | |
| Begin PHY specific section { | | See applicable PHY section. |
| for (i=1; i<=n; i++) { | | For each DL-MAP element 1 to n. |
| UL-MAP_IE ( ) | variable | See corresponding PHY specification. |
| } | | |
| } | | |
| If ! (byte boundary) { | | |
| Padding Nibble | 4 bits | Padding to reach byte boundary. |
| } | | |
| } | | |

As shown in Table 2, the UL_MAP message includes a plurality of IEs, that is, the 'Management Message Type' indicating the type of a transmitted message, the 'Uplink Channel ID' indicating a used uplink channel identifier, and the 'UCD count' indicating a count corresponding to the configuration variation of an uplink channel descript (UCD) message containing an uplink burst profile. In addition, the UL_MAP message may include an IE of 'Number of UL_MAP Elements n' indicating the number of elements existing after the UCD count. Herein, the uplink channel identifier is uniquely allocated in a media access control (MAC) sub-layer.

Figure 4D:
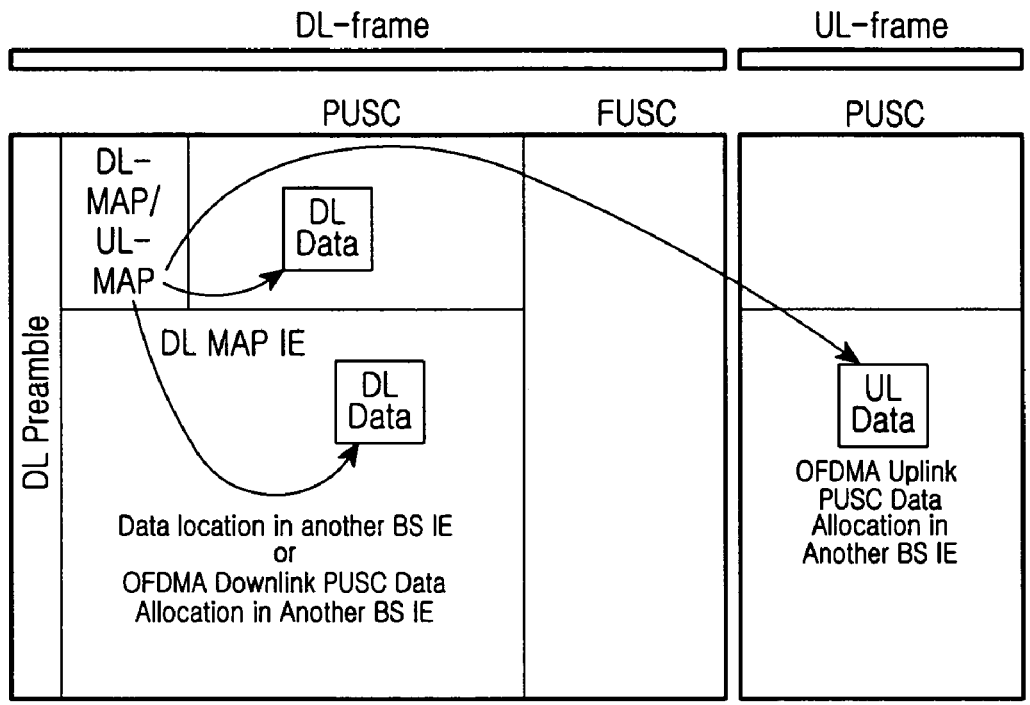
Figure 4D:
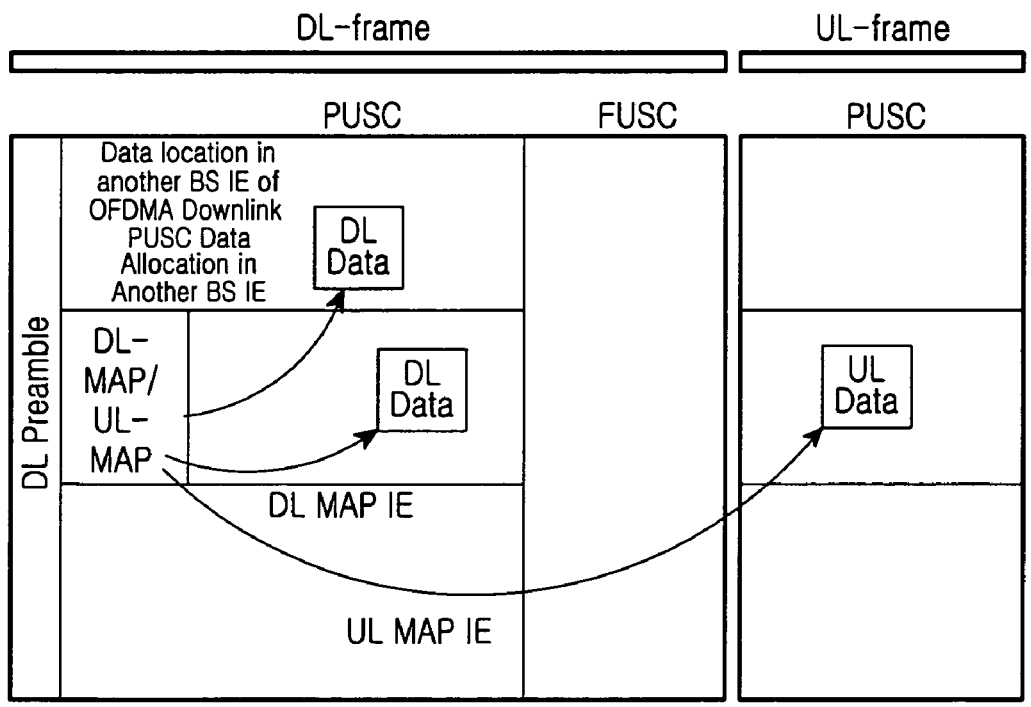

FIG. 4D shows a diagram for explaining a PUSC subchannel allocation scheme according to another alternative embodiment of the present invention. That is, FIG. 4D shows the case in which the same soft handover operations of FIGS. 4B and 4C are performed, but MAP IEs for appointing a position for an uplink data burst are different.

In FIG. 4D, either DL_MAP IEs and 'Data location in another BS IE' as described with reference to FIG. 4C, or the DL_MAP IEs and 'OFDMA Downlink PUSC Data Allocation in Another BS IE' proposed by the present invention may be used as MAP IEs for appointing positions for two downlink data bursts.

Table 3 shows a configuration of downlink MAP IEs for providing a soft handover proposed by the present invention.

TABLE 3

| Syntax | Size | Notes |
|---|---|---|
| OFDMA Downlink PUSC Data Allocation in Another BS IE ( ) { | | |
| Extended DIUC | 4 bits | Downlink Data Allocation in Another BS IE ( ) = 0x0? |

TABLE 3-continued

| Syntax | Size | Notes |
| --- | --- | --- |
| Length | 4 bits | Length=0x09 |
| Segment | 2 bits | Segment number for other BS' sector |
| IDcell | 5 bits | Cell ID for other BS' sector |
| OFDMA symbol offset | 8 bits | |
| Subchannel offset | 6 bits | |
| No. OFDMA symbols | 8 bits | |
| No. Subchannels | 6 bits | |
| Boosting | 3 bits | 000: normal (not boosted) 001: +6 dB; 010: −6 dB; 011: +9 dB; 100: +3 dB; 101: −3 dB; 110: −9 dB; 111: −12 dB |
| Repetition coding indication | 2 bits | 00 - No repetition coding 01 - Repetition coding of 2 used 10 - Repetition coding of 4 used 11 - Repetition coding of 6 used |
| CID | 16 bits | |
| DIUC | 4 bits | |
| reserved | 4 bits | shall be set to zero |
| } | | |

Table 3 shows "OFDMA Downlink PUSC Data Allocation in Another BS IEs". In the MAP IEs for using a downlink PUSC subchannel of an neighbor sector, the first four bits represent the type of corresponding MAP IEs. Herein, the types of the MAP IEs have no direct relation with the present invention, so detailed description thereof will be omitted.

The 'Length' having a size of 4 bits indicates the entire length of the MAP IEs, which is measured by the unit of byte. Since the MAP IEs have 72 bits in total, the 'Length' is set as '9'. The 'Segment' indicates the segment number of an neighbor sector which transmits a downlink PUSC subchannel. An MSS can determine the position of the PUSC subchannel area, to which a data burst allocated through the MAP IEs belongs, by using-the segment number. The 'IDcell' indicates a cell identifier (cell ID) of the neighbor sector that transmits a downlink PUSC subchannel. The MSS uses the value of the 'IDcell' to select a sub-carrier included in a downlink PUSC subchannel. The 'OFDMA Symbol Offset' indicates an OFDMA symbol start position of an allocated data burst, and is described in a unit of 'OFDMA symbol'. The 'Subchannel Offset' indicates a start index number of a subchannel to transmit a data burst. The 'No. OFDMA Symbols' indicates the number of OFDMA symbols occupied by a data burst to be transmitted. The 'No. Subchannels' indicates the number of subchannels to transmit a data burst. The 'Boosting' indicates whether or not sub-carriers of a data burst to be transmitted is boosted and a boosting value thereof. The 'Repetition Coding Indication' indicates whether or not an information code of a data burst to be transmitted is subjected to repetition coding. The 'CID' indicates a connection identifier (CID) of an MSS to receive relevant MAP IEs. The 'DIUC' indicates a physical channel processing scheme, e.g., a modulation scheme and a coding scheme, of a downlink data burst to be transmitted. Finally, the 'Reserved bit' indicates padding bits which are padded so that the MAP IEs may have a length of integer times of the byte unit.

Next, in the case of an uplink in FIG. 4D, the UL_MAP IEs of the IEEE 802.16 system may be utilized when α sector uses a data burst allocated to the own PUSC subchannel area, and the 'OFDMA Uplink PUSC Data Allocation in Another BS IEs' proposed by the present invention may be utilized when a sector appoints a data burst allocated to a different sector' PUSC subchannel area. The IEs included in the UL_MAP message according to an embodiment of the present invention will now be schematically described with reference to Table 4.

Table 4 shows a configuration of uplink MAP IEs for providing a soft handover proposed by the present invention.

TABLE 4

| Syntax | Size | Notes |
| --- | --- | --- |
| OFDMA Uplink Data Allocation in Another BS IE ( ) { | | |
| Extended UIUC | 4 bits | Uplink Data Allocation in Another BS IE ( ) = 0x0? |
| Length | 4 bits | Length=0x08 |
| CID | 16 bits | |
| UIUC | 4 bits | |
| Segment | 2 bits | Segment number for other BS' sector |
| UL_IDcell | 7 bits | Cell ID for other BS' sector |
| OFDMA symbol offset | 8 bits | |
| Subchannel offset | 6 bits | |
| Duration | 10 bits | |
| Repetition coding indication | 2 bits | 00 - No repetition coding 01 - Repetition coding of 2 used 10 - Repetition coding of 4 used 11 - Repetition coding of 6 used |
| reserved | 1 bit | shall be set to zero |
| } | | |

Table 4 shows "OFDMA Uplink PUSC Data Allocation in Another BS IEs". In the MAP IEs for using an uplink PUSC subchannel of an neighbor sector, the first four bits indicates the type of corresponding MAP IEs. The types of the MAP IEs have no direct relation with the present invention, so detailed description thereof will be omitted.

The 'Length' having a size of 4 bits indicates the entire length of the MAP IEs, which is expressed by the unit of byte. Herein, since the MAP IEs have 64 bits in total, the 'Length' is set as '8'. The 'CID' indicates a connection identifier of an MSS to receive relevant MAP IEs. The 'UIUC' indicates a physical channel processing scheme, e.g., a modulation scheme and a coding scheme, of an uplink data burst to be transmitted. The 'Segment' indicates the segment number of an neighbor sector which transmits an uplink PUSC subchannel. An MSS can determine the position of the PUSC subchannel area, to which a data burst allocated through the MAP IEs belongs, by using the segment number.

Herein, it is assumed that the MSS knows the range of a PUSC subchannel area used by the neighbor sector in advance through a handover control message or an information message of an neighbor BS before the MSS uses the MAP IEs shown in Table 4. The 'IDcell' indicates a cell identifier (cell ID) of the neighbor sector that transmits an uplink PUSC subchannel. The MSS uses the value of the 'IDcell' to select a sub-carrier included in an uplink PUSC subchannel. The 'OFDMA Symbol Offset' indicates an OFDMA symbol start position of an allocated data burst, and is described in a unit of 'OFDMA symbol'. The 'Subchannel Offset' indicates a start index number of a subchannel to transmit a data burst. The 'Duration' indicates the number of OFDMA slots occupied by a data burst. The 'Repetition Coding Indication' indicates whether or not an information code of a data burst to be transmitted is subjected to repetition coding. Finally, the 'Reserved bit' indicates padding bits which are padded so that the MAP IEs may have a length of integer times of the byte unit.

Hereinafter, another configuration of downlink MAP IEs for providing a soft handover proposed by the present invention, which is different from that shown in Table 3, will be described with reference to Table 5.

TABLE 5

| Syntax | Size | Notes |
|---|---|---|
| OFDMA Downlink PUSC Data Allocation in Another BS IE ( ) { | | |
| Extended DIUC | 4 bits | Downlink Data Allocation in Another BS IE ( ) = 0x0? |
| Length | 4 bits | Length=0x0A |
| Segment | 2 bits | Segment number for other BS' sector |
| IDcell | 5 bits | Cell ID for other BS' sector |
| Used Subchannels | 6 bits | Used subchannels at other BS' sector Bit #0: 0–11 Bit #1: 12–19 Bit #2: 20–31 Bit #3: 32–39 Bit #4: 40–51 Bit #5: 52–59 |
| OFDMA symbol offset | 8 bits | |
| Subchannel offset | 6 bits | |
| No. OFDMA symbols | 8 bits | |
| No. Subchannels | 6 bits | |
| Boosting | 3 bits | 000: normal (not boosted) 001: +6 dB; 010: −6 dB; 011: +9 dB; 100: +3 dB; 101: −3 dB; 110: −9 dB; 111: −12 dB |
| Repetition coding indication | 2 bits | 00 - No repetition coding 01 - Repetition coding of 2 used 10 - Repetition coding of 4 used 11 - Repetition coding of 6 used |
| CID | 16 bits | |
| DIUC | 4 bits | |
| reserved | 6 bits | shall be set to zero |
| } | | |

As shown in Table 5, a different point between the MAP IEs of Table 5 and the MAP IEs of Table 3 is that the MAP IEs of Table 5 further include an information element of 'Used Subchannels'. The 'Used Subchannels' appoints a range of a PUSC subchannel area of an neighbor sector allocated through the MAP IEs. That is, an MSS can determine information about subchannels, which the neighbor sector is using, by using bit-map information included in the 'Used Subchannels'. In Table 5, the other fields except for the 'Used Subchannels' are nearly identical to those shown in Table 3, so a detailed description thereof will be omitted. The length of the MAP IEs have 80 bits in total, so that the 'Length' field is set as '10'.

In addition, according to an embodiment of the present invention, when information about downlink 'Used Channels' is reported to an MSS through an upper message either before a handover initiation or during a handover initiation procedure, the MAP IEs shown in Table 3 may be used during a soft handover. In contrast, when information about the 'Used Channels' is not reported to an MSS before a soft handover is performed, the MAP IEs shown in Table 5 are used during the soft handover. That is, according to system's situation, the MAP IEs of Table 3 and the MAP IEs of Table 5 may be selectively used.

Herein, the PUSC subchannel allocation scheme shown in FIG. 4D requires the use of a relatively larger amount of MAP IEs as compared with the schemes shown in FIGS. 4B and 4C. However, in the case of FIG. 4D, all sectors included in an active set notifies, through the MAP IEs, the MSS of the positions of all data bursts allocated to the MSS. Therefore, it is unnecessary for the MSS to receive the MAP messages of all sectors. In other words, the MSS can determine the position of the data bursts allocated to the MSS although receiving only the MAP message of any one sector. In this case, the MSS selects a sector from which the control signal (e.g., a preamble) having the largest intensity is received, and selects a MAP message transmitted from the selected sector. The MAP IE use method as described above increases the probability of success in transmitting MAP IEs.

To perform the above-mentioned soft handover according to the present invention, the difference between the transmission delays of signals which are transmitted/received between an MSS and two BSs, i.e. a serving BS and a target BS, should be significantly smaller than the length of a cyclic prefix (CP) of an OFDM symbol. That is, when the difference between the transmission delays of signals, which are transmitted/received between an MSS and two BSs, is larger than the length of the CP, inter-symbol interference may occur during fast Fourier transform (FFT) processing procedures of an MSS's or BS's reception stage.

Herein, the transmission delay of the two reception signals may be estimated by the difference 'Arrival_Time_Difference' between reception arrival times of preambles transmitted in a downlink. Before a soft handover is initiated, an MSS measures an arrival time of a preamble reception signal received from each neighbor cell, and calculates a difference between each measured arrival time and a preamble arrival time received from a current-connected cell, on the basis of the preamble arrival time received from a current-connected cell. Thereafter, the calculated value is reported to a serving BS. Then, the serving BS determines whether to allow a soft handover by using the reported value. This may be expressed by Equation (1). That is, Equation (1) may be used to apply the above-mentioned condition required for a handover to a system.

$$\text{Arrival\_Time\_Difference}(j) = \text{1st\_Arrival\_Time\_AS} - \text{Arrival\_Time}(j) \quad (1)$$

In Equation (1), the 'Arrival_Time_Difference (j)' indicates a relative arrival time point of a signal received from a $j^{th}$ sector included in a neighbor set. The '1st_Arrival_Time_AS' indicates the earliest arrival time point of arrival time points of preamble reception signals received from sectors included in an active set. The 'Arrival_Time (j)' indicates an arrival time point of a preamble reception signal received from the $j^{th}$ sector.

In this case, the value of 'Arrival_Time_Difference (j)' shown in Equation (1) is calculated in the MSS and then is included in a handover initiation request message to be reported to a BS. Typically, since an MSS handover request (MOB-MSSHO-REQ) message is used as a handover initiation request message in the IEEE 802.16 system, it is preferred that the 'Arrival_Time_Difference (j)' is newly added to the MOB-MSSHO-REQ message to be reported to the BS. In addition, the value of 'Arrival_Time_Difference (j)' may be expressed with a basic unit of '(Tb/32)/4', in which 'Tb' indicates the length of an effective OFDMA symbol.

To achieve the mixed scheme of the hard handover and the soft handover according to an embodiment of the present invention, an active set, a holding set and a neighbor set are defined as follows.

The active set is defined as a set of sectors that currently provide wireless channels for data transmission/reception to an MSS.

The holding set is a set of sectors that are not included in the active set by a determination of the system, although the intensities of signals received from the relevant sectors satisfies the condition required for the active set. In addition, for a handover between neighbor sectors of the same BS, the system may instruct a relevant MSS to perform a hard handover instead of a soft handover. In this case, the corresponding sector may be included in the holding set. In addition, for a handover between two sectors of different BSs, when the two sectors use the same PUSC subchannel area, the system may instruct a relevant MSS to perform a hard handover instead of a soft handover, in which case, the corresponding sector may be included in the holding set.

The neighbor set is a set of the remaining sectors except for the sectors included in the active set and the holding set from among the whole neighbor sectors.

According to an embodiment of the present invention, when both Equations (2) and (3) are satisfied, it is possible to include a relevant neighbor sector in the active set.

$$\text{Max\_P\_RX\_AS} - \text{P\_RX}(j) < H(\text{dB}) \quad (2)$$

In Equation (2), the 'Max_P_RX_AS' indicates the maximum value of the intensities of the preamble reception signals received from sectors included in the active set. The 'P_RX (j)' indicates the intensity of the preamble reception signal received from a $j^{th}$ sector included in a neighbor set. The 'H' indicates 'Hysteresis margin'.

$$\text{Arrival\_Time\_Difference}(j) < c*Tg \quad (3)$$

In Equation (3), the 'Arrival_Time_Difference (j)' indicates a relative arrival time point of a signal received from a $j^{th}$ sector included in the neighbor set. The 'c' is a constant equal to or smaller than '1'. The 'Tg' indicates the length of a CP.

When a sector included in the active set satisfies one of the following Equations (4) and (5), the relevant sector is removed from the active set.

$$\text{Max\_P\_RX\_AS} - \text{P\_RX}(j) > H(\text{dB}) \quad (4)$$

$$\text{1st\_Arrival\_Time\_AS} - \text{Arrival\_Time}(j) > c*Tg \quad (5)$$

When a sector of a neighbor set satisfying Equation (2) does not satisfy Equation (3), and thus is not included in the active set, the relevant sector is included in the holding set. In addition, although a sector of a neighbor set satisfying Equation (2) satisfies Equation (3), the relevant sector is included in the holding set when not included in the active set by a system instruction. When a sector included in the holding set satisfies Equation (4), the relevant sector is removed from the holding set.

When a specific sector included in the holding set satisfies Equation (6), all sectors currently-included in the active set are removed from the active set, and only the specific sector is included in the active set. That is, a hard handover is performed.

$$\text{P\_RX}(j) - \text{Max\_P\_RX\_AS} > H(\text{dB}) \quad (6)$$

Figure 5A:
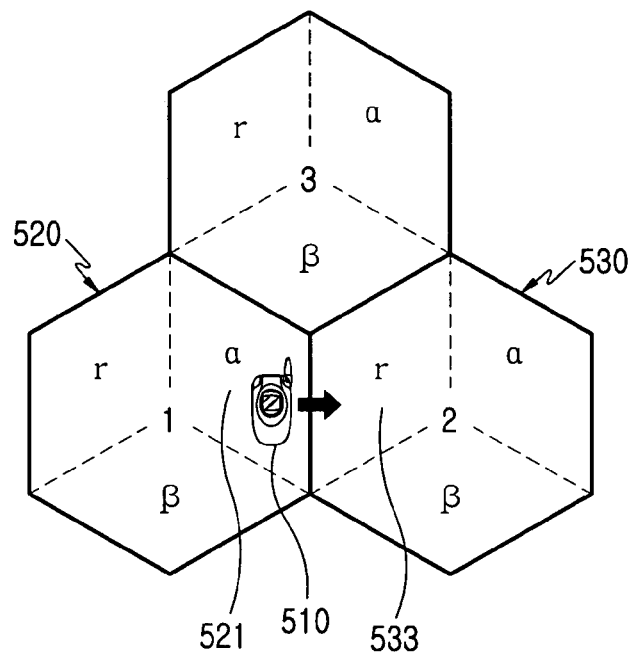
FIGS. 5A to 5B are schematic diagrams for explaining a 2-way soft handover performance procedure in a broadband wireless access communication system according to an embodiment of the present invention.
Figure 5B:
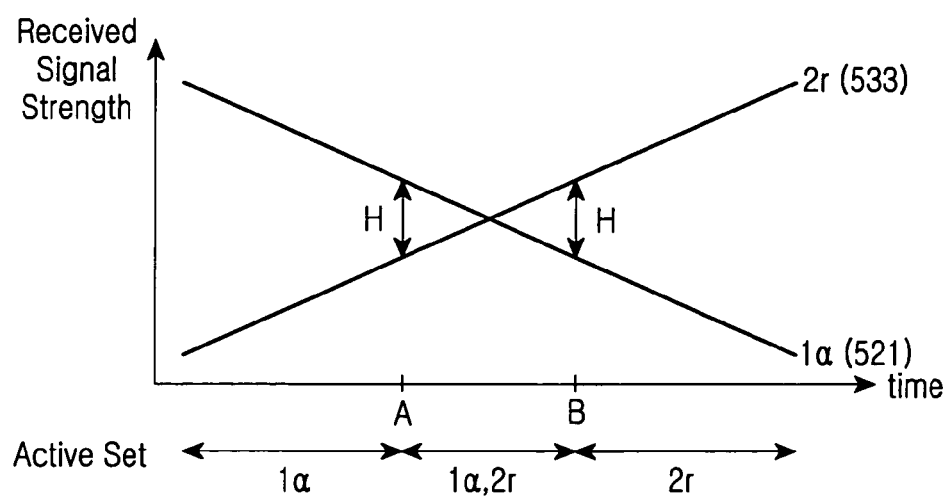

FIGS. 5A and 5B are schematic diagrams for explaining a 2-way soft handover performance procedure in a communication system according to an embodiment of the present invention. That is, FIGS. 5A and 5B show the case of a 2-way soft handover in which two sectors are included in the active set.

FIG. 5A shows the case in which an MSS 510 moves from an α sector 521 of cell #1 520, which is the service coverage of BS 1, to a γ sector 533 of cell #2 530, which is the service coverage of BS 2.

Herein, it is assumed in this embodiment shown in FIGS. 5A and 5B that Equation (3) is satisfied over the whole time-axis range. At time point 'A' shown in FIG. 5B, the γ sector 533 of cell #2 530 satisfies Equation (2), thereby being included in the active set. At time point 'B', the α sector 521 of cell #1 520 satisfies Equation (4), thereby being removed from the active set.

Therefore, the soft handover period is from time point 'A' to time point 'B'. During this soft handover period, the α sector 521 of cell #1 520 and the γ sector 533 of cell #2 530 are included in the active set.

Figure 6A:
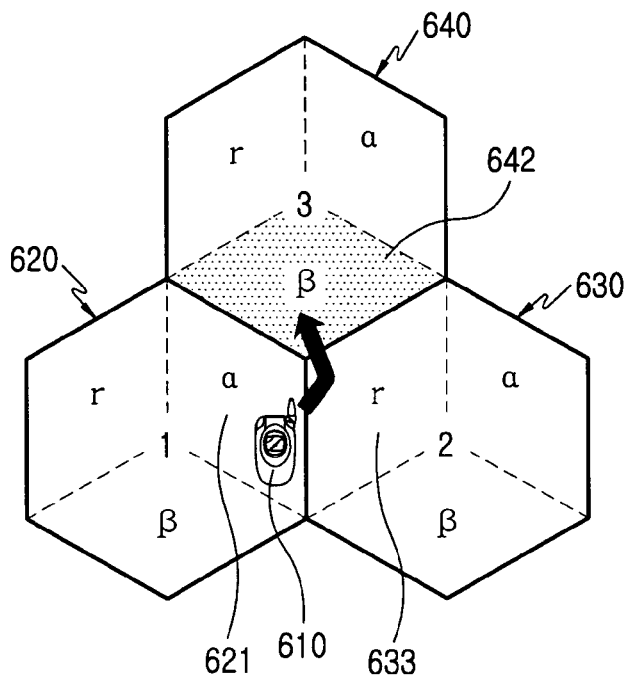
FIGS. 6A to 6B are schematic diagrams for explaining a 3-way soft handover performance procedure in a broadband wireless access communication system according to an embodiment of the present invention.
Figure 6B:
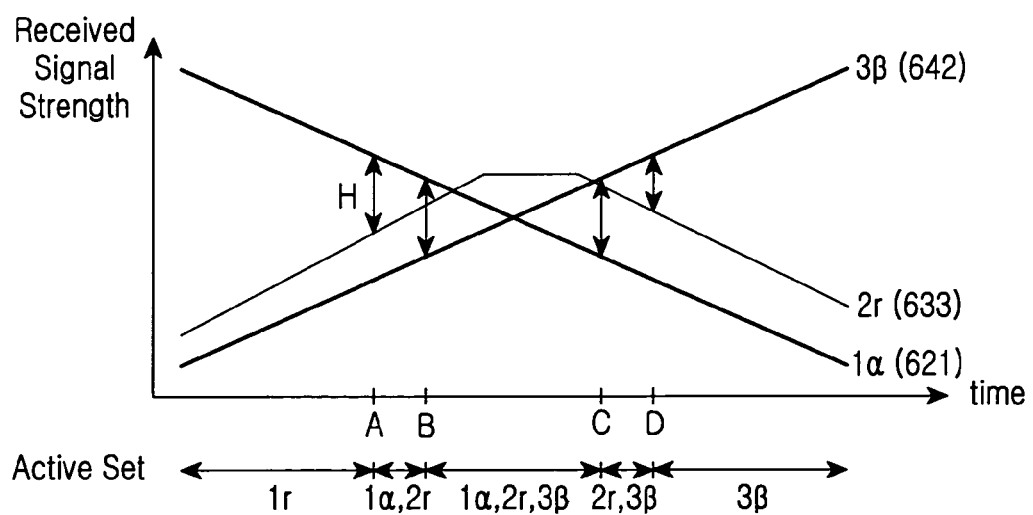

FIGS. 6A and 6B are schematic diagrams for explaining a 3-way soft handover performance procedure in a communication system according to an embodiment of the present invention. That is, FIGS. 6A and 6B show the case of a 3-way soft handover in which three sectors are included in the active set.

FIG. 6A shows the case in which an MSS 610 moves from an α sector 621 of cell #1 620 (the service coverage of BS 1) to a β sector 642 of cell #3 640 (the service coverage of BS 3) via a γ sector 633 of cell #2 630 (the service coverage of BS 2).

Herein, it is assumed in this embodiment shown in FIGS. 6A and 6B that Equation (3) is satisfied over the whole time-axis range. At time point 'A' shown in FIG. 6B, the γ sector 633 of cell #2 630 satisfies Equation (2), thereby being included in the active set. In addition, at time point 'B' shown in FIG. 6B, the β sector 642 of cell #3 640 satisfies Equation (2), thereby being included in the active set. Therefore, during a period from time point 'A' to time point 'B', the α sector 621 of cell #1 620 and the γ sector 633 of cell #2 630 are included in the active set.

Next, at time point 'C', the α sector 621 of cell #1 620 satisfies Equation (4), thereby being removed from the active set. Accordingly, during a period from time point 'B' to time point 'C', the α sector 621 of cell #1 620, the γ sector 633 of cell #2 630 and the β sector 642 of cell #3 640 are included in the active set.

Thereafter, at time point 'D', the γ sector 633 of cell #2 630 satisfies Equation (3), thereby being removed from the active set. Therefore, during a period from time point 'C' to time point 'D', the γ sector 633 of cell #2 630 and the β sector 642 of cell #3 640 are included in the active set.

Figure 7A:
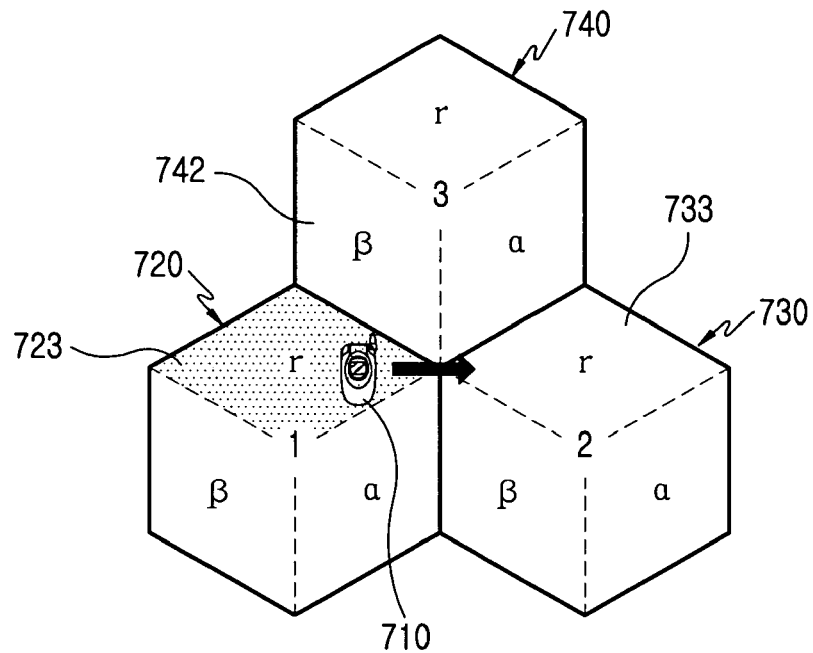
FIGS. 7A to 7B are schematic diagrams for explaining a procedure of performing a hard handover after a 2-way soft handover in a broadband wireless access communication system according to an embodiment of the present invention.
Figure 7B:
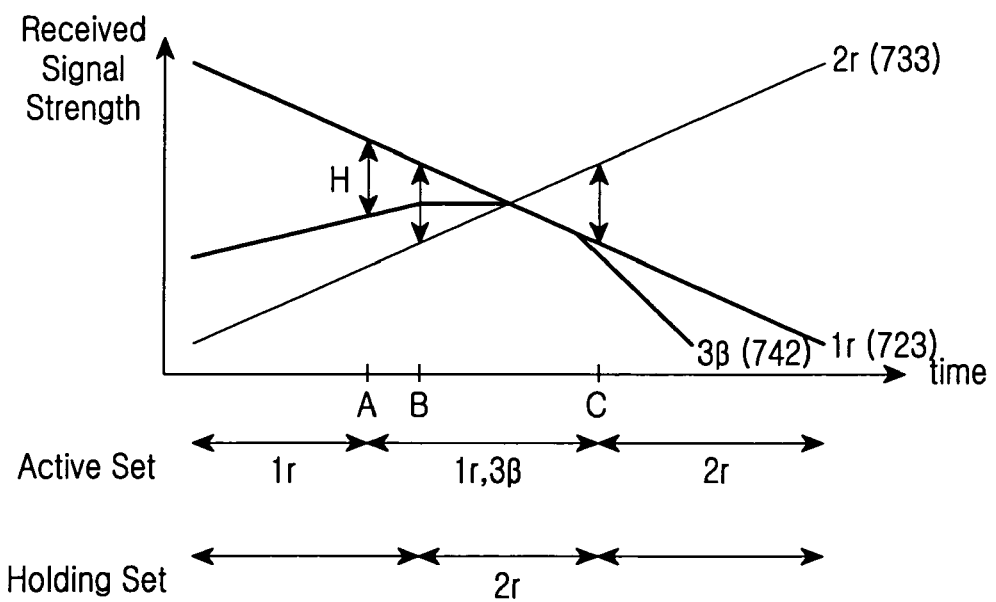

FIGS. 7A and 7B are schematic diagrams for explaining a procedure of performing a hard handover after a 2-way soft handover in a communication system according to an embodiment of the present invention. That is, FIGS. 7A and 7B show the case in which a 2-way soft handover, that two sectors are included in the active set, is first initiated and then a hard handover is performed.

Referring to FIG. 7A, an MSS 710 moves from a γ sector 723 of cell #1 720 (the service coverage of BS 1) to a γ sector 733 of cell #2 730 (the service coverage of BS 2) via a boundary of a β sector 742 of cell #3 740 (the service coverage of BS 3).

Herein, it is assumed in this embodiment shown in FIGS. 7A and 7B that Equation (3) is satisfied over the whole time-axis range. In addition, for convenience of description, this embodiment is explained without considering signals of an α sector of cell #1 720, an α sector of cell #3 740 and a β sector of cell #2 730. At time point 'A' shown in FIG. 7B, the β sector 742 of cell #3 740 satisfies Equation (2), thereby being included in the active set. At time point 'B', although the γ sector 733 of cell #2 730 satisfies Equation (2), the system does not allow the γ sector 733 of cell #2 730 to be included in the active set. In this case, therefore, the γ sector 733 of cell #2 730 is included in the holding set.

At time point 'C', the γ sector 733 of cell #2 730 satisfies Equation (6). At time point 'C', the γ sector 723 of cell #1 720 and the β sector 742 of cell #3 740, which have been currently included in the active set, are removed from the active set, and then the γ sector 733 of cell #2 730 is included in the active set. That is, a hard handover is performed at time point 'C'.

Figure 8:
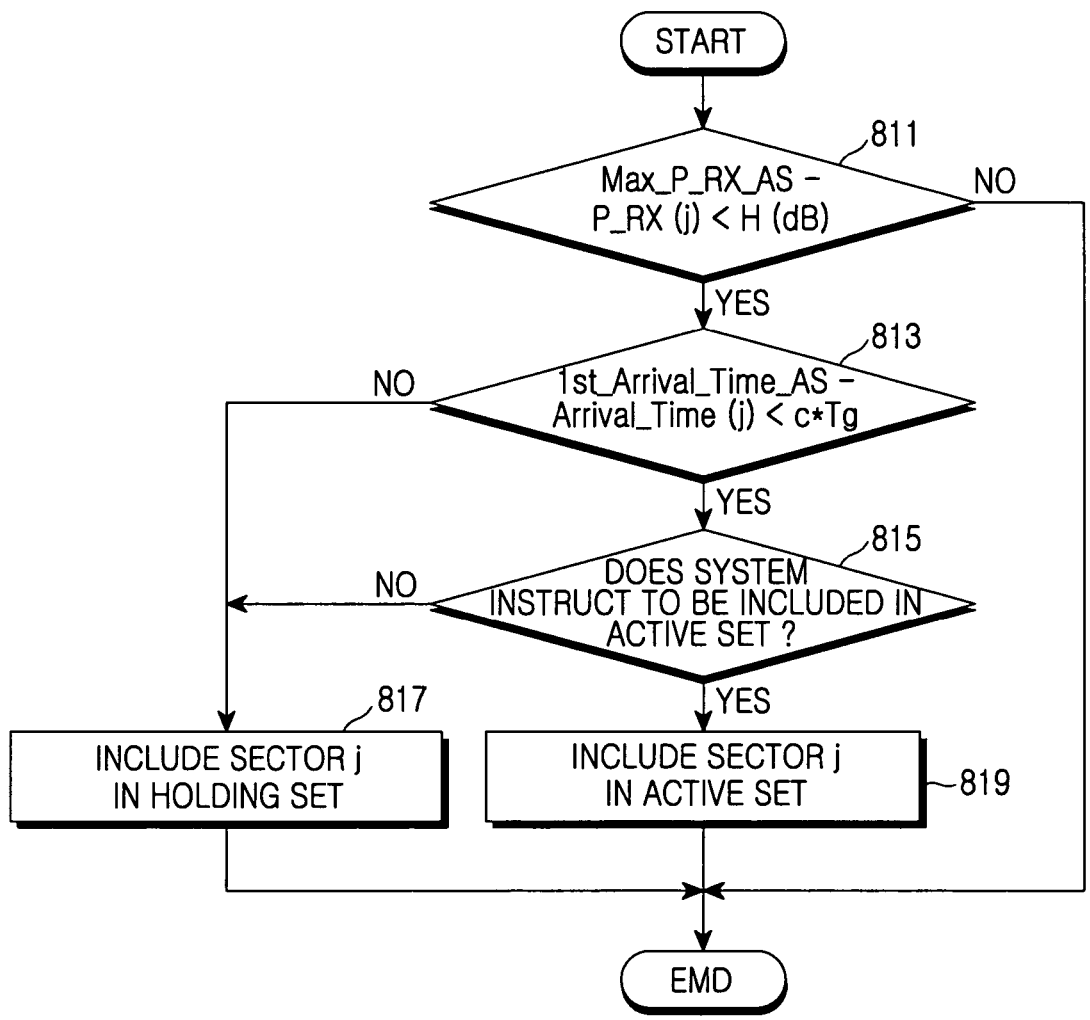
FIG. 8 is a flowchart for explaining an operation procedure of processing a sector of a neighbor set to be included in an active set or a holding set in a broadband wireless access communication system according to an embodiment of the present invention.

FIG. 8 is a flowchart for explaining an operation procedure of including a sector of a neighbor set in an active set, or a holding set, in a communication system according to an embodiment of the present invention.

First, in step 811, the intensity of a preamble reception signal received from a $j^{th}$ sector of a neighbor set is compared with the maximum value of the intensities of preambles received from an active set, and then it is determined if the result value of the comparison satisfies Equation (2). That is, the difference between the maximum value 'Max_P_RX_AS' from among intensities of preamble reception signals received from the sectors included in the active set, and an intensity 'P_RX (j)' of a preamble reception signal received from the $j^{th}$ sector included in the neighbor set is calculated, and then compared with a Hysteresis margin 'H'.

When the comparison result satisfies Equation (2), i.e. when the result value obtained the calculation is smaller than the Hysteresis margin, step 813 is performed. In step 813, an arrival time point of a preamble received from the $j^{th}$ sector is compared with the earliest the arrival time point of the arrival time points of preambles received from the active set, and then it is determined if the result value of the comparison satisfies Equation (3). The difference between the earliest arrival time point '1st_Arrival_Time_AS' from among the arrival time points of preamble reception signals received from the sectors included in the active set, and the arrival time point 'Arrival_Time (j)' of the preamble reception signal received from the $j^{th}$, sector is calculated. Then, the calculated difference value is compared with a value obtained by multiplying a constant 'c(c<1)' by the length 'Tg' of the CP.

When the result of the comparison satisfies Equation (3), that is, when the calculated difference value is smaller than the value obtained by multiplying the constant 'c' by the length 'Tg' of the CP, step 815 is performed. In contrast, when the comparison result of step 813 does not satisfy Equation (3), step 817 is performed. In step 817, the $j^{th}$ sector is included in the holding set, and then the procedure ends.

At step 815, the system determines whether or not to allow the $j^{th}$ sector to be included in the active set, and then informs the MSS of the determination. Thereafter, one of steps 819 and 817 is performed according to the determined content. That is, when the system determines that the $j^{th}$ sector should be included in the active set, step 819 is performed. In step 819, the $j^{th}$ sector is included in the active set, and then the procedure ends. In contrast, when the system determines that the $j^{th}$ sector should not be included in the active set, step 817 is performed. In step 817, the $j^{th}$ sector is included in the holding set, and then the procedure ends.

Figure 9:
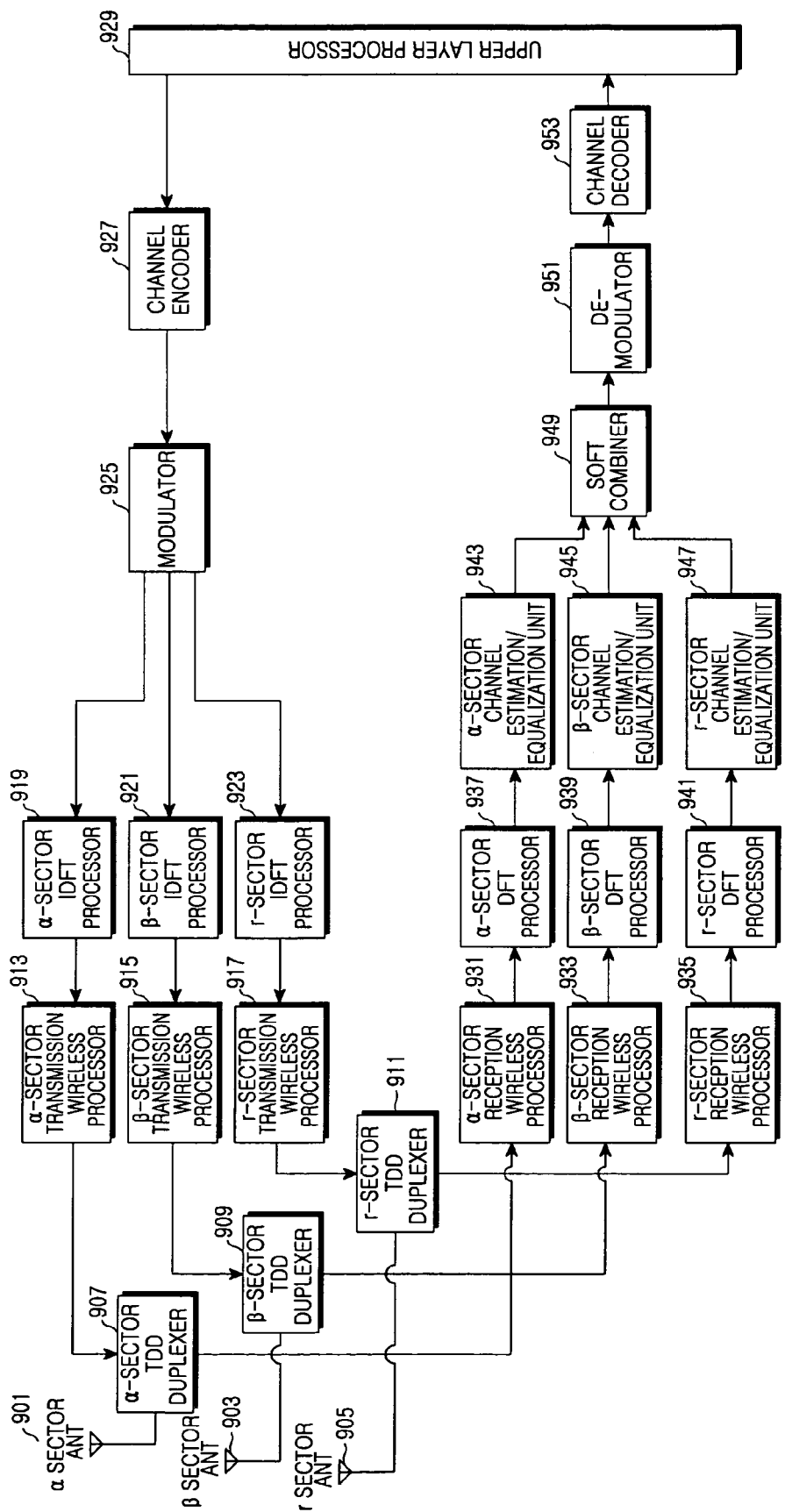
FIG. 9 is a block diagram schematically illustrating an interior configuration of a base station for performing the functions for achieving the present invention.

FIG. 9 is a block diagram schematically illustrating an interior configuration of a BS apparatus for performing the functions according to an embodiment of the present invention.

The BS apparatus includes a transmission section and a reception section. The transmission section of the BS apparatus includes: a plurality of transmission/reception antennas (e.g., an α-sector antenna 901, a β-sector antenna 903 and a γ-sector antenna 905); an α-sector Time Division Duplexing (TDD) duplexer 907, a β-sector TDD duplexer 909 and a γ-sector TDD duplexer 911; an α-sector transmission wireless processor 913, a β-sector transmission wireless processor 915 and a γ-sector transmission wireless processor 917; an α-sector Inverse Discrete Fourier Transform (IDFT) processor 919, a β-sector IDFT processor 921 and a γ-sector IDFT processor 923; a modulator 925; a channel encoder 927; and an upper layer processor 929.

The reception section of the BS apparatus includes: the plurality of transmission/reception antennas (e.g., an α-sector antenna 901, a β-sector antenna 903 and a γ-sector antenna 905); an α-sector transmission wireless processor 931, a β-sector transmission wireless processor 933 and a γ-sector transmission wireless processor 935; an α-sector Discrete Fourier Transform (DFT) processor 937, a β-sector DFT processor 939 and a γ-sector DFT processor 941; an α-sector channel estimation/equalization unit 943, a β-sector channel estimation/equalization unit 945 and a γ-sector channel estimation/equalization unit 947; a soft combiner 949; a demodulator 951; a channel decoder 953; and an upper layer processor 929.

First, according to a signal processing procedure of the transmission section in the BS apparatus, the upper layer processor 929 generates and outputs a user information signal to the channel encoder 927. The channel encoder 927 receives the user information signal generated from the upper layer processor 929, performs a channel coding for the received user information signal, and outputs the channel-coded signal to the modulator 925. The modulator 925 receives and modulates the channel-coded signal, and then outputs the modulated signal to a transmission module for a connected sector. That is, the modulator 925 outputs the modulated signal to a transmission module for a connected sector, from among an α-sector transmission module, a β-sector transmission module and a γ-sector transmission module. In this case, if the MSS is undergoing a softer handover, the modulated signal is output to transmission modules for all sectors included in an active set. Herein, as described above, the active set is defined as a set of sectors or BSs that are currently providing wireless channels for data transmission/reception to the MSS.

In the α-sector transmission module, a transmission signal for the α-sector is received from the modulator 925, passes through the α-sector IDFT processor 919, the α-sector transmission wireless processor 913 and the α-sector TDD duplexer 907, and then is output through the α-sector antenna 901 over the air.

In the β-sector transmission module, a transmission signal for the β-sector is received from the modulator 925, passes through the β-sector IDFT processor 921, the β-sector transmission wireless processor 915 and the β-sector TDD duplexer 909, and then is output through the β-sector antenna 903 over the air.

In the γ-sector transmission module, a transmission signal for the γ-sector is received from the modulator 925, passes through the γ-sector IDFT processor 923, the γ-sector transmission wireless processor 917 and the γ-sector TDD duplexer 911, and then is output through the γ-sector antenna 905 over the air.

Next, according to a signal processing procedure of the reception section in the BS apparatus, the reception section receives signals received according to sectors through a plurality of transmission/reception antennas (e.g., an α-sector antenna 901, a β-sector antenna 903 and a γ-sector antenna 905).

According to an α-sector reception module, a signal (α-sector reception signal) received from the α sector is transmitted through the α-sector antenna 901 and the α-sector TDD duplexer 907 to the α-sector transmission wireless processor 931. The α-sector transmission wireless processor 931 outputs a baseband signal to the α-sector DFT processor 937. The α-sector DFT processor 937 performs DFT processing for the input baseband signal, and then outputs the DFT-processed signal to the α-sector channel estimation/equalization unit 943. The α-sector channel estimation/equalization unit 943 estimates the channel state of the α-sector reception signal, and then compensates the α-sector reception signal. Thereafter, the compensated reception signal is output to the soft combiner 949.

According to a β sector reception module, a signal (β-sector reception signal) received from the β sector is transmitted through the β-sector antenna 903 and the β-sector TDD duplexer 909 to the β-sector transmission wireless processor 933. The β-sector transmission wireless processor 933 outputs a baseband signal to the β-sector DFT processor 939. The β-sector DFT processor 939 performs DFT processing for the input baseband signal, and then outputs the DFT-processed signal to the β-sector channel estimation/equalization unit 945. The β-sector channel estimation/equalization unit 945 estimates the channel state of the β-sector reception signal, and then compensates the β-sector reception signal. Thereafter, the compensated reception signal is output to the soft combiner 949.

According to a γ sector reception module, a signal (γ-sector reception signal) received from the γ sector is transmitted through the γ-sector antenna 905 and the γ-sector TDD duplexer 911 to the γ-sector transmission wireless processor 935. The γ-sector transmission wireless processor 935 outputs a baseband signal to the γ-sector DFT processor 941. The γ-sector DFT processor 941 performs DFT processing for the input baseband signal, and then outputs the DFT-processed signal to the γ-sector channel estimation/equalization unit 947. The γ-sector channel estimation/equalization unit 947 estimates the channel state of the γ-sector reception signal, and then compensates the γ-sector reception signal. Thereafter, the compensated reception signal is output to the soft combiner 949.

Preferably, when not only a PUSC subchannel included in its own PUSC area, but also a PUSC subchannel included in a PUSC area of another sector, is received by any one of the α-sector, β-sector and γ sector reception modules receives through its own antenna, the relevant reception module receives the PUSC subchannel to generate a compensated baseband signal.

In addition, each operation of the α-sector β-sector and γ sector reception modules depends on whether or not a relevant MSS is under going a softer handover. In other words, when the MSS is performing a softer handover, a reception module for a connected sector (i.e., a sector included in an active set) operates; reception modules for the other sectors does not operate. In this case, the soft combiner 949 performs a soft combining of a signal input to each sector reception module.

Herein, the soft combining performed by the soft combiner 949 includes a coherent combining. In addition, the soft combiner 949 individually compensates the plurality of signals, and then performs a combining by using channel state information as weights. A representative soft combiner is a maximal ratio combiner. Through the processing of the soft combiner 949 as described above, a diversity gain of an uplink signal can be obtained in a softer handover.

The signal having undergone the processing of the soft combiner 949 passes through the demodulator 951 and the channel decoder 953, thereby being restored to a user signal.

Meanwhile, in the case of receiving a normal uplink signal other than the case of the softer handover, one reception module connected to a relevant MSS from among the three reception modules (i.e. the α-sector, β-sector and γ sector reception modules) operates. In this case, the soft combiner 949 intactly outputs an input signal to the demodulator 951. The signal output from the soft combiner 949 passes through the demodulator 951 and the channel decoder 953, thereby being restored to a user signal.

In addition, in the case where a soft handover is performed as opposed to the softer handover described above, when each of the sectors included in an active set belongs to a distinct BS, the corresponding reception signal processing procedure is similar to the above-mentioned reception signal processing procedure for a normal uplink signal. However, in the case of the softer handover, a finally-restored user signal is transmitted to a BSC or master BS, and then the BSC or master BS selects a user signal having the best signal quality from among user signals received a plurality of BSs.

Figure 10:
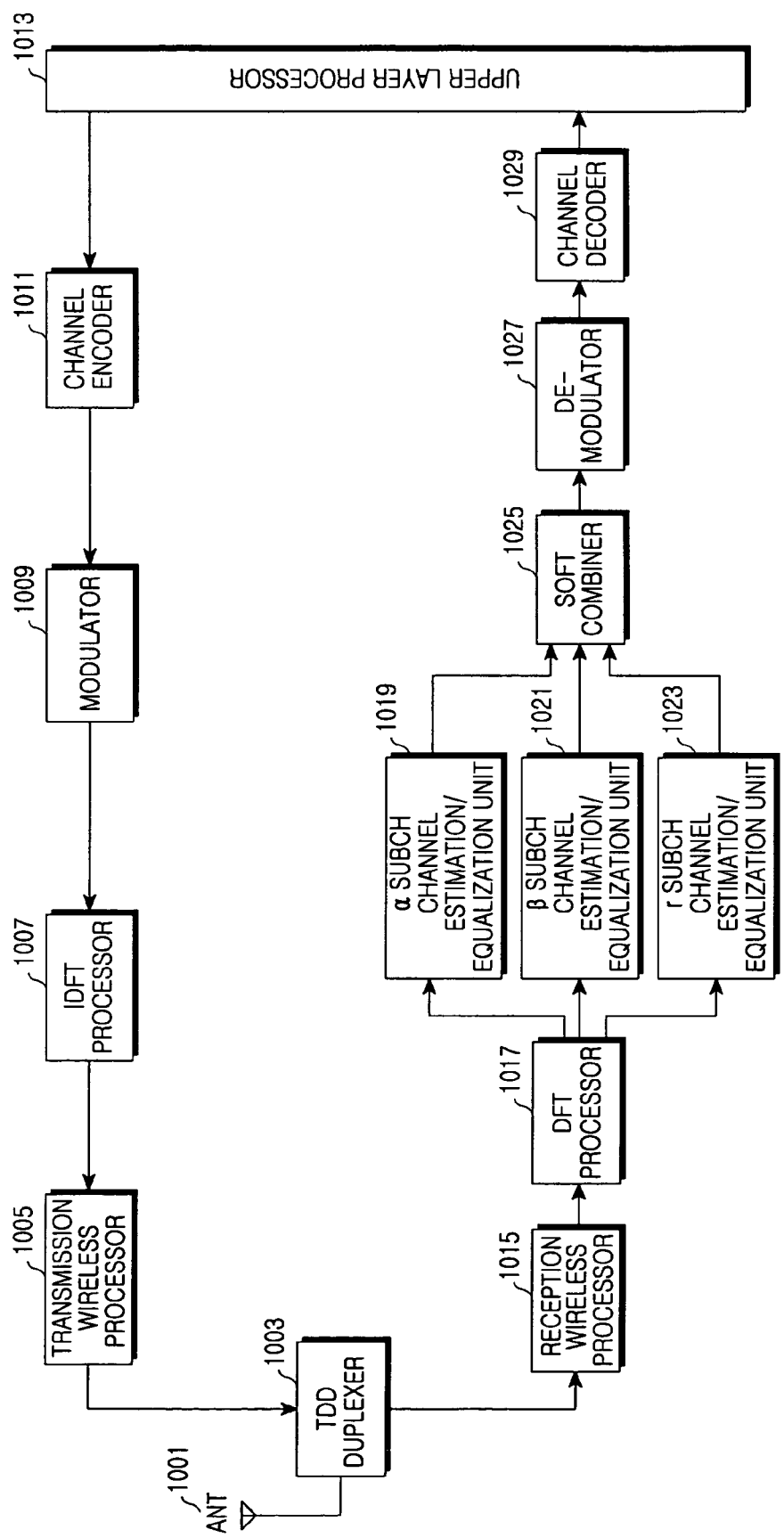
FIG. 10 is a block diagram schematically illustrating an interior configuration of a mobile subscriber station for performing the functions for achieving the present invention.

FIG. 10 is a block diagram schematically illustrating an interior configuration of an MSS apparatus for performing the functions according to an embodiment of the present invention.

The MSS apparatus includes a transmission section and a reception section. The transmission section of the MSS apparatus includes a transmission/reception antenna 1001, a TDD duplexer 1003, a transmission wireless processor 1005, an IDFT processor 1007, a modulator 1009, a channel encoder 1011, and an upper layer processor 1013.

The reception section of the MSS apparatus includes the transmission/reception antenna 1001; the TDD duplexer 1003; a reception wireless processor 1015; a DFT processor 1017; a plurality of channel estimation/equalization units, e.g., a first channel estimation/equalization unit 1019 for an α-sector (segment) subchannel, a second channel estimation/equalization unit 1021 for an β-sector (segment) subchannel, and a third channel estimation/equalization unit 1023 for an γ-sector (segment) subchannel; a soft combiner 1025; a demodulator 1027; a channel decoder 1029; and an upper layer processor 1013.

First, according to the transmission section of the MSS apparatus, a user information signal generated from the upper layer processor 1013 is channel-coded in the channel encoder 1011, and is then modulated in the modulator 1009. The modulated transmission signal passes through the IDFT processor 1007, the transmission wireless processor 1005 and the TDD duplexer 1003 and is output via the antenna 1001.

Next, according to the reception section of the MSS apparatus, the TDD duplexer 1003 receives a signal in a TDD scheme via the antenna 1001. The TDD duplexer 1003 outputs the received signal to the reception wireless processor 1015, and then the reception wireless processor 1015 outputs a baseband signal to the DFT processor 1017. The DFT processor 1017 performs DFT processing for the input baseband signal, and then outputs the DFT-processed signal to a channel estimation/equalization unit 1019, 1021 or 1023 for a relevant sector (segment).

The MSS receives data bursts from two or more sectors while performing a soft or softer handover. Therefore, the reception section of the MSS apparatus individually compensates signals received from each sector and then performs a soft combining of the compensated signals. In the MSS apparatus shown in FIG. 10, such a processing procedure is performed by the first channel estimation/equalization unit 1019 for an α-sector (segment) subchannel, the second channel estimation/equalization unit 1021 for an β-sector (segment) subchannel, the third channel estimation/equalization unit 1023 for an γ-sector (segment) subchannel, and the soft combiner 1025.

To process a subchannel signal included in the segment of each sector, a signal output from the DFT processor 1017 is input to the channel estimation/equalization units 1019, 1021 and 1023 for each sector subchannel.

The first channel estimation/equalization unit 1019 for the α-sector (segment) subchannel performs channel estimation for a received signal of a subchannel included in the segment area of the α sector, and then compensates the received signal of the relevant subchannel by using the estimation result.

The second channel estimation/equalization unit 1021 for the β-sector (segment) subchannel performs channel estimation for a received signal of a subchannel included in the segment area of the β sector, and then compensates the received signal of the relevant subchannel by using the estimation result.

The third channel estimation/equalization unit 1023 for the γ-sector (segment) subchannel performs channel estimation for a received signal of a subchannel included in the segment area of the γ sector, and then compensates the received signal of the relevant subchannel by using the estimation result.

The soft combiner 1025 performs a soft combining of received signals input from the channel estimation/equalization units 1019, 1021 and 1023 for each sector. In this case, a maximal ratio combiner may be used as the soft combiner 1005. The processing procedure of the soft combiner 1025 provides a diversity gain of a downlink signal. Next, An output signal of the soft combiner 1025 passes through the demodulator 1027 and the channel decoder 1029, thereby being restored to a user signal.

Meanwhile, when the MSS is in course of neither a soft handover nor a softer handover, the MSS receives a data burst from one sector. In this case, from among the three channel estimation/equalization units 1019, 1021 and 1023, the one connected to a channel operates. That is, an output signal of the DFT processor 1017 is input to a corresponding channel estimation/equalization unit, and then the corresponding channel estimation/equalization unit outputs the input signal to the soft combiner 1025. In this case, since a soft handover procedure is unnecessary, the soft combiner 1025 outputs the input signal to the demodulator 1027. Thereafter, the signal input to the demodulator 1027 passes through the channel decoder 1029, thereby being restored to a user signal.

As described above, the present invention provides a method for transmitting uplink and downlink data bursts for a soft/softer handover in a communication system employing an OFDMA scheme and the configurations of the transmitter and receiver therefore.

That is, according to an embodiment of the present invention, in a downlink, sectors included in an active set allocate a plurality of PUSC subchannels and transmit the same data to a relevant MSS. Then, the MSS receives a plurality of PUSC subchannel signals and then performs a soft combining of the received signals, thereby achieving a soft handover or softer handover. In addition, in an uplink, a PUSC subchannel corresponding to a PUSC area of one sector from among sectors included in an active set is allocated to a relevant MSS, and the relevant MSS transmits data through the allocated PUSC subchannel. Then, a plurality of BSs or a plurality of sectors receive an uplink signal transmitted from the MSS, so that a soft handover or softer handover is achieved.

In addition, according to an embodiment of the present invention, the configurations of the transmission/reception sections for an MSS and the transmission/reception sections of a BS are provided to perform a soft handover and a softer handover in an OFDMA system. According to the configurations of the MSS and BS proposed by an embodiment of the present invention, in the OFDMA system, it is possible to improve the quality of a received signal in an MSS located at a cell boundary and also to prevent a ping-pong effect, which is problematic of a hard handover.

As described above, according to the apparatuses and the method for supporting a handover in a broadband wireless access communication system in accordance with the present invention, it is possible to provide a soft handover and a softer handover in the OFDMA communication system. In addition, the present invention provides the method and the transmitter/receiver configurations for allocating PUSC subchannels for an uplink and a downlink. By using the method and the transmitter/receiver configurations, a soft/softer handover is achieved in the OFDMA communication system, so that the qualities of received signals in MSSs located at a cell boundary are improved, and in addition, a ping-pong effect is prevented.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for supporting a handover in a broadband wireless access communication system that includes a Mobile Subscriber Station (MSS), a serving Base Station (BS) currently providing service to the MSS, and a plurality of neighbor BSs, in which each of the BSs includes cells using distinct subchannel bands, the method comprising the steps of:

establishing a set of BSs that currently provide wireless channels for data transmission/reception to the MSS;

classifying, by each BS, entire subchannels into a plurality of sets of subchannels; and allocating each of the plurality of sets of subchannels obtained by the classification to a Partial Usage of Subchannels (PUSC) subchannel area of each sector, said PUSC subchannel area being a location in a burst, wherein, every BS included in an active set selects an equal number of PUSC subchannels from among a PUSC subchannel area allocated to each of the BSs and allocates the selected PUSC subchannels to the MSS, wherein the MSS receives a downlink signal transmitted through each of the PUSC subchannel areas and performs a predetermined combining of all signals received from each of the BSs, and wherein, in the predetermined combining, all of the signals are individually compensated and then the predetermined combining is performed for the compensated signals by using channel state information as a predetermined weight.

2. The method as claimed in claim 1, wherein signals transmitted from the PUSC subchannel areas have equal signal information, to which an equal modulation scheme and an equal coding scheme are applied.

3. The method as claimed in claim 1, wherein the predetermined combining includes a soft combining.

4. The method as claimed in claim 1, wherein the predetermined combining includes a coherent combining.

5. The method as claimed in claim 1, wherein the active set includes a set of sectors which provide wireless channels for data transmission/reception to the MSS.

6. A method for supporting a handover in a broadband wireless access communication system that includes a Mobile Subscriber Station (MSS), a serving Base Station (BS) currently providing service to the MSS, and a plurality of neighbor BSs, in which each of the BSs includes cells using distinct subchannel bands, the method comprising the steps of:

establishing a set of BSs that currently provide wireless channels for data transmission/reception to the MSS;

classifying, by each BS, entire subchannels into a plurality of sets of subchannels; and allocating each of the plurality of sets of subchannels obtained by the classification to a Partial Usage of Subchannels (PUSC) subchannel area of each sector, said PUSC subchannel area being a location in a burst, wherein, a latest-registered BS from among BSs included in an active set selects a PUSC subchannel allocated to itself from among the PUSC subchannel area, and transmits the selected PUSC subchannel to the MSS, wherein the MSS transmits an uplink signal through the selected PUSC subchannel, and wherein other BSs except for the latest-registered BS in the active set confirms a PUSC subchannel transmitted by the MMS through signaling with the latest-registered BS.

7. The method as claimed in claim 6, wherein the latest-registered BS includes latest-registered sectors.

8. The method as claimed in claim 6, wherein signals transmitted from the PUSC subchannel area have equal signal information, to which an equal modulation scheme and an equal coding scheme are applied.

9. The method as claimed in claim 6, wherein the active set includes a set of sectors that provide wireless channels for data transmission/reception to the MSS.

10. The method as claimed in claim 6, wherein, when sectors included in the active set belong to different BSs, the BS selects a signal having a best reception quality from among received signals.

11. The method as claimed in claim 6, wherein when sectors included in the active set belong to different BSs, a Base Station Controller (BSC) selects a signal having a best reception quality from among received signals.

12. The method as claimed in claim 6, wherein, when sectors included in the active set belong to the same BS, the BS performs a soft combining of signals received from the sectors.

* * * * *